US011080168B1

(12) United States Patent
Choudhury

(10) Patent No.: US 11,080,168 B1
(45) Date of Patent: Aug. 3, 2021

(54) SYSTEM, METHOD AND APPARATUS FOR SELECTION OF HARDWARE AND SOFTWARE FOR OPTIMAL IMPLEMENTATION OF ONE OR MORE FUNCTIONALITY OR ALGORITHM

(71) Applicant: Konark Research, Inc., Nashua, NH (US)

(72) Inventor: Durga Prasad Choudhury, Nashua, NH (US)

(73) Assignee: Konark Research, Inc., Nashua, NH (US)

( * ) Notice: Subject to any disclaimer, the term of this patent is extended or adjusted under 35 U.S.C. 154(b) by 0 days.

(21) Appl. No.: 16/413,323

(22) Filed: May 15, 2019

Related U.S. Application Data

(60) Provisional application No. 62/672,796, filed on May 17, 2018.

(51) Int. Cl.
*G06F 11/36* (2006.01)
*G06F 11/22* (2006.01)
*G06F 11/34* (2006.01)

(52) U.S. Cl.
CPC .......... *G06F 11/3664* (2013.01); *G06F 11/22* (2013.01); *G06F 11/3466* (2013.01); *G06F 11/3688* (2013.01)

(58) Field of Classification Search
CPC .. G06F 11/22; G06F 11/3664; G06F 11/3466; G06F 11/3688
See application file for complete search history.

(56) References Cited

U.S. PATENT DOCUMENTS 7,165,253 B1 * 1/2007 Pike ................. G06F 9/541
707/999.101
7,266,805 B2 9/2007 Weidman
(Continued)

OTHER PUBLICATIONS

Alex Shye et al., "Code Coverage Testing Using Hardware Performance Monitoring Support", [Online], pp. 159-163, [Retrieved from Internet on Mar. 18, 2021], <https://dl.acm.org/doi/pdf/10.1145/1085130.1085151> (Year: 2005).*

(Continued)

*Primary Examiner* — Ziaul A Chowdhury
(74) *Attorney, Agent, or Firm* — Loginov & Associates, PLLC; William A. Loginov

(57) ABSTRACT

A system, method and apparatus for choosing a digital processing platform that is optimal for a specified type of application and satisfies a set of user-specified constraints is provided. In operation, all known parameters on all available processing platforms in a database are stored, providing this information to a computer software application run by the user by querying the database, and then allowing a remote user to specify the constraints, in terms of hardware and system software, to eliminate those entries that would not satisfy the constraints in a step-by-step filtering process. The user then chooses a set of application programs to run on the platforms that were not eliminated. The runtime performance parameters/characteristics—e.g. computational throughput, I/O bandwidth, environmental parameters, etc. are measured to select the optimal solution. The system and method also allows for a regression test to ensure consistency between test software processes running on discrete platforms.

8 Claims, 18 Drawing Sheets

(56) References Cited

U.S. PATENT DOCUMENTS

| | | | |
|---|---|---|---|
| 7,529,990 B2 | 5/2009 | Haggerty | |
| 8,589,205 B2 | 11/2013 | Dayasindhu | |
| 8,949,791 B2 | 2/2015 | Lu | |
| 8,996,988 B2 | 3/2015 | Yee | |
| 9,170,847 B2 | 10/2015 | Huggins | |
| 9,317,629 B1 | 4/2016 | Koh | |
| 2003/0204371 A1* | 10/2003 | Sciamanna | G06F 11/2294 702/183 |
| 2007/0050677 A1* | 3/2007 | Klamik | G06F 11/3688 714/47.2 |
| 2007/0288134 A1* | 12/2007 | Rollinger | F02D 41/222 701/32.8 |
| 2011/0112790 A1* | 5/2011 | Lavie | G06F 11/263 702/123 |
| 2014/0047342 A1* | 2/2014 | Breternitz | G06F 9/5061 715/735 |
| 2014/0281733 A1* | 9/2014 | Singonahalli | G06F 11/3688 714/38.1 |
| 2015/0370691 A1 | 12/2015 | Pandey | |
| 2016/0065656 A1* | 3/2016 | Patin | H04L 67/12 709/201 |
| 2017/0111246 A1* | 4/2017 | Shaw | H04L 43/08 |
| 2019/0173764 A1* | 6/2019 | Di Martino | H04L 41/145 |
| 2020/0006988 A1* | 1/2020 | Leabman | A61B 8/56 |

OTHER PUBLICATIONS

David J. Barnhart et al., "Radiation Hardening by Design of Asynchronous Logic for Hostile Environments", [Online], pp. 1617-1628, [Retrieved from Internet on Mar. 19, 2021], <https://ieeexplore.ieee.org/stamp/stamp.jsp?arnumber=4907322> (Year: 2009).*

Stefano Di Carlo et al., "An On-Line Testing Technique for the Scheduler Memory of a GPGPU", [Online], pp. 16893-16912, [Retrieved from Internet on Mar. 19, 2021], <https://ieeexplore.ieee.org/stamp/stamp.jsp?arnumber=8963963> (Year: 2020).* https://www.xcelerit.com/computing-benchmarks/processors/ (retrieved on Apr. 11, 2018) describes ideas that are targeted at high performance computing benchmarks, 4 pages.

* cited by examiner

No platforms were found that would satisfy all of your constraints

1010

Select application to upload

| App Name | | Operating System | CPU Architecture | Register Width |
|---|---|---|---|---|
| Choose File | No file chosen | All ▼ | All ▼ | All ▼ |

Upload  Skip

The following matching executables were found

Custom programs

| App Name | App Version | Processor | Board | OS Kernel | OS Version | User Library | U.L. Version | Remarks | Pre-run checklist | Include? | Regression Suite | Include? |
|---|---|---|---|---|---|---|---|---|---|---|---|---|
| Foomatic | 1.3 | ARM | SuperBoard | Linux | 3.13 | glibc | 4.2 | Needs kernel 3.10 or newer | Oscilloscope Connection | | Foomatic Test | |
| Foomatic | 1.4RT | ARM | MegaBoard | RTOS A | 2.17 | NA | NA | Uses NEON instructions | DUT Mains Connection | | Realtime Test | |

Standard Benchmarks

| Benchmark | Version | Processor | Board | OS Kernel | OS Version | User Library | U.L. Version | Remarks | Pre-run checklist | Include? | Regression Suite | Include? |
|---|---|---|---|---|---|---|---|---|---|---|---|---|
| SPEC FLOPS | 1.0 | ARM | SuperBoard | Linux | 2.6.10 | glibc | 4.2 | Integer ALU Benchmark | None | | None | |
| STREAMS | 1.0 | ARM | SuperBoard | Linux | 2.6.10 | glibc | 4.2 | Memory Benchmark | None | | Access Pattern | |

Library routines

| Library | Version | Algorithm | Processor | Board | OS Kernel | OS Version | User Library | U.L. Version | Remarks | Pre-run checklist | Include? | Regression Suite | Include? |
|---|---|---|---|---|---|---|---|---|---|---|---|---|---|
| Signal Processing | 1.0 | FFT | ARM | SuperBoard | Linux | 2.6.10 | glibc | 4.2 | | None | | None | |
| Image Processing | 1.0 | Deconvolution | ARM | SuperBoard | Linux | 2.6.10 | glibc | 4.2 | | None | | Histogram | |

Start Execution — 1340

Fig. 13

Execution Status

| Board | Index | Completions | Failures | Running App | Operating System | Status | Remaining | Action |
|---|---|---|---|---|---|---|---|---|
| Superboard | 1 | 1 | 0 | Foomatic | Linux 3.13 | Pre-run checklist | 4 | Start |
| Superboard | 2 | 0 | 0 | STREAMS | Linux 3.13 | Running | 1 | View Log |
| Megaboard | 2 | 0 | 0 | STREAMS | Linux 3.13 | Running | 1 | View Log |
| Basicboard | 1 | ? | ? | Motor Control | RTOS A | Unknown | ? | |
| Basicboard | 2 | ? | ? | DAQ Test | RTOS A | Unknown | ? | |

— 1510 Control Wiring

System Status 5 out of 8 runs completed on network enabled boards.
System Uptime: 1h 23m 36s
Total Number of boards: 7
Total Number of running boards: 5
Total Number of boot failures: 2
Of which those that are network enabled: 3

Fig. 15

SYSTEM, METHOD AND APPARATUS FOR SELECTION OF HARDWARE AND SOFTWARE FOR OPTIMAL IMPLEMENTATION OF ONE OR MORE FUNCTIONALITY OR ALGORITHM

RELATED APPLICATIONS

This application claims the benefit of U.S. Provisional Application Ser. No. 62/672,796, filed May 17, 2018, entitled SYSTEM, METHOD AND APPARATUS FOR SELECTION OF HARDWARE AND SOFTWARE FOR OPTIMAL IMPLEMENTATION OF ONE OR MORE FUNCTIONALITY OR ALGORITHM, the entire disclosure of which is herein incorporated by reference.

FIELD OF THE INVENTION

This invention relates to systems and methods for choosing a digital hardware processing platform and software or firmware for this hardware that is optimal for a set of applications while satisfying certain user-specified constraints.

BACKGROUND OF THE INVENTION

Currently, there are too many choices of processor architectures, motherboards, operating systems, etc. for any given type of software application. For example, an application might execute on a traditional CPU (Central Processing Unit), an auxiliary processor such as a GPU (Graphics Processing Unit), DSP (Digital Signal Processor), FPGA (Field Programmable Gate Array), etc. or a combination of more than one of these. In many cases, the CPU and the auxiliary processor are integrated together in the same physical module but must be programmed separately. The CPU itself comes in many different architectures, such as x86, MIPS, ARM, PowerPC etc., from different manufacturers, and with different feature set even within a given family of chip. For example, some implementation of the ARM family of CPU include cryptography instructions in their implementation and some do not. And a given family of CPU may have many sub-families with important differences. For example, the ARM family has the A series, R series and M series subfamilies in addition to many earlier subfamilies. All of these considerations also hold true for the auxiliary processors. In addition, the architecture of the platform, for example, whether the main and the auxiliary processors share memory, and if so, if they share memory in a cache coherent fashion, will likely make a difference to software performance.

In addition to the above consideration, there might be other considerations for a system designer that does not pertain directly to execution speed. For example, there could be restrictions on power consumption, monetary cost, mechanical size or volume of the electrical circuit assembly or its weight. The temperature rise and temperature distribution on the board during code execution could be a concern. There could be regulatory issues, for example, that it comply with the standards set forth by a particular authority such as the FDA, a military standard setting body, or similar.

There could also be restrictions imposed by system integration limitations. For example, if the device in consideration is to be integrated with a third party device, it needs to have a compatible input/output (I/O) standard with the other device, such as a camera, sensor or data acquisition board.

In addition to all the above mentioned variability in hardware, there is usually a wide choice of operating system or firmware (together referred to as 'system software' in this document). The common x86 CPU architecture runs Microsoft Windows, Linux, various variants of the BSD operating system, Oracle's Solaris, Apple's OS X, Android and others. Further, some of these families of system software usually have sub-families as well. For example, the well-known Linux operating system can be configured to run in a 'real-time mode' (e.g. to have a lower latency for processor interrupts). The system software introduces one more dimension to the variability of the platform.

A system level test can include hardware, operating system or firmware and application software, all running together. For this to happen, application software must be ported and compiled to run on a specific processor architecture and a specific operating system. Software porting is mostly a manual, labor-intensive process fraught with pitfalls and the ported software must be extensively validated to ensure that the logic of the original code was correctly copied. And in some situations the source of the application may not be readily available for porting. This can happen, for example, where the source must remain secret for commercial or national security reasons.

Given the large number of possible hardware and system software combinations, and the efforts involved in porting application software to all of these makes it impractical to find the optimal solution by manually trying out all of the possible solutions exhaustively. Currently, the industry trend seems to be to choose a solution that the engineering team has most familiarity with, for example, from a past project. Thus, many times, a sub-optimal solution is chosen.

Some, but not all, aspects of the problem can be solved by consulting a datasheet or similar document. This is a time consuming approach. Potentially a large number of datasheets need to be aggregated and consulted manually for each new project. However, some aspects of the problem cannot be found in any kind of datasheets, no matter how complete they are. For example, the actual power consumed while executing a specific algorithm or the interrupt latency in a specific situation can only be found empirically.

There have been several attempts to solve related problems using computer-assisted automation. In U.S. Pat. No. 7,529,990, Haggerty discloses a method of testing a set of handheld devices for compatibility with a set of software. The disclosure of this reference neither addresses the issues of runtime performance benchmarking nor tests for environmental parameters. In U.S. Pat. No. 7,266,805, Weidman et al. disclose a method for generating software builds for many different hardware from a common code base. However, this is done for the purpose of distributing the binary code and not for performance evaluation. In U.S. Pat. No. 8,949,791 Lu at al. disclose a method of automated software testing. The problem of system level performance test is not addressed here. U.S. Pat. No. 8,996,988 by Yee discloses a method of automating compatibility testing of web applications across browsers. Although the basic idea of automated software testing is present in this patent, it is limited to web applications and does not deal with hardware selection. U.S. Pat. No. 9,170,847 by Huggins et al. discloses a similar concept, but is also targeted to web applications only. In U.S. Pat. No. 9,317,629, Koh, et al. disclose a method of automated software verification, but again, this does not help solve the issue of choosing the hardware. In published U.S. patent application 2015/0370691, Pandey discloses a method of automated software testing framework, but this too does not address issues surrounding code porting and selection for a specific purpose. A peripherally related idea of computer-aided classification of information technology projects in terms of their business value is disclosed in U.S. Pat. No. 8,589,205 by Dayasindhu, et al. The website at https://www.xcelerit.com/computing-benchmarks/processors/ (retrieved on Apr. 11, 2018) describes ideas that are targeted at high performance computing benchmarks only, and does not address issues of hardware fitness for a given purpose.

SUMMARY OF THE INVENTION

This invention overcomes disadvantages of the prior art, and generally solves the problems discussed above by executing the software process(es)/algorithm(s) of the deployable device in a prototype device (usually an evaluation board or other commodity hardware) running the system software of choice, optionally in the environmental conditions of deployment (such as elevated humidity level, presence of dust, unusual temperature range and other similar environment) to verify performance parameters such as execution time, real time latency, power consumption, device temperature, emitted electromagnetic radiation etc. This verifies operation at system level rather that separately for the software and hardware. It addresses the problem of software porting by using either pre-written benchmarks or wrappers around pre-written libraries for the target hardware whenever possible. Notably, the system and method operates at a fraction of the time and manpower/resources previously required by conventional means.

This is accomplished by aggregating information on as large a swath of the available solution space as possible in a database; that is, as many possible choices of processing architecture, board size, power consumption, unit cost, supported system software, and the like. This can include all available choices, but due to the rapid progress of technology and frequent availability of new hardware and software, this may not be practical. Some of the entries in this database could be taken off hardware manufacturer's datasheets, some could be taken from third party vendors, such as printed circuit board manufacturers who are using the chip, and some could be taken from the designer's own past in-house experience. This database is created only once and is updated whenever entries are obsoleted or new information is available.

In order to use the system and method herein, the user can run a program in his/her computer and can be initially presented a list of the entire inventory of available hardware and system software. This can be done by querying the database from the computer program and populating the fields of the user interface with the results of the query. This can be the broadest solution space possible consisting of all available hardware and system software. The user then can start narrowing down the solution space by choosing the parameters required for their design. Once the user is done choosing hardware and system software, (s)he would either upload his/her custom-written application program to a server from where the board(s) under evaluation would download and run it or copy it to a storage media local to the board under evaluation or choose from a set of pre-written applications or benchmarks to run. Optionally, the user can choose a set of regression tests to run following the application program. Upon the user's command, the selected application programs can run and environmental parameters such as temperature of the board, power consumed, electromagnetic radiation generated etc. can be logged. The output, error and instrumentation messages (such as instruction execution throughput) etc. are logged and the user is notified when all the chosen applications are finished running or a pre-set time limit has been exceeded.

In an embodiment, a system for optimal selection of hardware and software can include at least two computer hardware systems and a user console, with the two computer hardware systems including a first computer hardware system and a second computer hardware system, and the second computer hardware system can have at least one component that is different from the first computer hardware system. The user console can have a processor with at least one testing module, and the testing module can be configured to run at least one test software program on the at least two computer hardware systems, and wherein the system for optimal selection generates results comparing the performance of at least two combinations of computer hardware systems and software programs.

In an illustrative embodiment, a system and method for determination of performance characteristics with respect to electronic hardware and user-selected test software, which is adapted to execute non-transitory computer-readable program instructions on the hardware, is provided. A processor is interconnected to a plurality of hardware devices under test, so that the processor accesses information related to the performance characteristics. A system process, operates on the processor, and is responsive to local or remote communication from a user. The system process is arranged to (a) identify one of the hardware device based upon selection of the local user via the communication, (b) activate the hardware device, (c) operate a software process on the device, and (d) return at least one of the performance characteristics based upon the operation of the software process. Illustratively, the performance characteristics can include at least one of temperature rise due to device operation, power consumption, execution speed, and electromagnetic (EM) radiation emission. In exemplary implementations, one or more sensors can be operatively connected to the hardware devices under test, so as to provide the performance characteristics. The system process can be arranged to access a database containing identification and parameter information with respect to each of the hardware devices under test and selected of the device related software. The system process can transmit a menu to the user that contains criteria based upon the identification and the parameter information. The menu can be arranged so that the user can select a subset of the hardware devices under test based upon selection of the criteria input thereby, and the menu can further be organized to provide a series of selections in corresponding selection steps. The menu can also be presented to the user such that each selection by the user provides consistent selection options in subsequent selection steps, whereby unavailable options are filtered therefrom. Illustratively, the system process is arranged to allow the user to (a) upload a custom software process to one or more of the selected devices under test and/or (b) provide a stock software process to the selected devices under test. In exemplary implementations, the user can be interconnected to the processor (a) via a console on a local network and/or (b) via a computing device on a wide area network. The wide area network can define a cloud-based computing environment and the plurality of hardware devices under test can be located in a remote facility on an interconnected network. Moreover, the communication can provide a web page containing the menu displayed on a remote computer of the user. In exemplary implementations, the test software is at least one a software defined radio (SDR), a software defined networking (SDN) and a software defined power supply (SDP), software defined data storage, software defined electromechanical system and a predetermined software-defined hardware process (SDX). The system process can be arranged to enable the user to select a plurality of hardware devices under test from the subset and determine the performance characteristics thereof with respect to the test software. The plurality of selected hardware devices from the subset are effectively co-tested. More particularly, the plurality of hardware devices under test can include at least one of a graphics processing unit (GPU), general or central processing unit (CPU), field programmable gate array (FPGA), application-specific integrated circuit (ASIC), programmable logic device (CPLD), digital signal processor (DSP), network processing unit (NPU), network fabric switching device, special purpose compute accelerator, data storage device, memory device, and disk. At least one of the plurality of devices under test can be located in either an ambient environment within the location, or in a controlled environment with changed environmental variables with respect to the ambient environment. Such environmental variables can be at least one of (a) ambient temperature, (b) atmospheric pressure, (c) humidity level, (d) presence of dust or contaminants, (e) electromagnetic radiation, and (f) shock and vibration. Illustratively, the system and method can further include a regression test process, arranged to provide results that determine validity of operation of results of the test software on two or more devices under test of the plurality of hardware devices under test. This regression test addresses potential variability between operation of the test software on two or more devices under test, so that such is accounted for and the results remain consistent across platforms within predetermined limits.

In an illustrative embodiment, a system and method is provided for remotely determining performance characteristics of interest to a user with respect to test software running on at least one of a plurality of devices under test located in an interconnected arrangement at one or more locations connected by a network. A system test process that (a) loads the test software with respect to the at least one of the plurality of devices under test and (b) returns the performance characteristics to the user via a network is performed. The user selects devices under test in response to an input of requirements by the user, based upon a plurality of criteria stored with respect to the system test process for each of the plurality devices under test. The system and method can include uploading, under direction of the user, of test software provided by the user, or stored with respect to the system test process, to the at least one of the plurality of devices under test. Further steps, processes and/or elements as described above can also be provided to this system and method In an illustrative embodiment, a system and method is provided for remotely determining performance characteristics of interest to a user with respect to test software running on at least one of a plurality of devices under test located in an interconnected arrangement at one or more locations connected by a network. A user interface is interconnected to a remote location via a WAN. The user interface allows selection by the user of at least one of the plurality of the devices under test. The test software is uploaded relative to the user interface to the remote location for operation on at least one of the plurality of devices under test. Illustratively, the user interface can include a web page having a menu that accesses available of the plurality of devices under test. The menu can be organized to provide a series of selections in corresponding selection steps and is presented to the user such that each selection by the user provides consistent selection options in subsequent selection steps. The unavailable options are accordingly filtered from the selection criteria in a narrowing process at each step. The system and method can operate a provisioning server, interconnected with the remote location, to control the upload and determine the performance characteristics. In an exemplary implementation, the system operators can add at least one new device under test to the plurality of devices under test when the new device under test becomes available, and can and associate appropriate information relative to the new device under test with respect to the provisioning server.

BRIEF DESCRIPTION OF THE DRAWINGS

The invention description below refers to the accompanying drawings, of which:

FIG. 4 is a graphical user interface showing the selection of a principle criterion for a constraint selection process, according to an illustrative embodiment;

FIG. 5 is a graphical user interface showing selection of the I/O interface, according to an illustrative embodiment;

FIG. 7 is a graphical user interface showing the selection of programming interfaces, according to an illustrative embodiment;

FIG. 9 is a screen showing an exemplary result the user would see after completing the constraint selection process, according to an illustrative embodiment;

FIG. 9A is a screen showing the status of the booting process after the step shown in FIG. 9 is executed, according to an illustrative embodiment;

FIG. 12 is a graphical user-interface that could be used to allow the user to upload new benchmarks or custom-written programs to the provisioning server from the user console, according to an illustrative embodiment;

FIG. 13 is a graphical user-interface that allows the user to select the application software to run on the hardware selected in the previous steps, according to an illustrative embodiment.

FIG. 15 is a screen showing the status indication on the user console as the test applications are executed, according to an illustrative embodiment.

DETAILED DESCRIPTION

Figure 1:
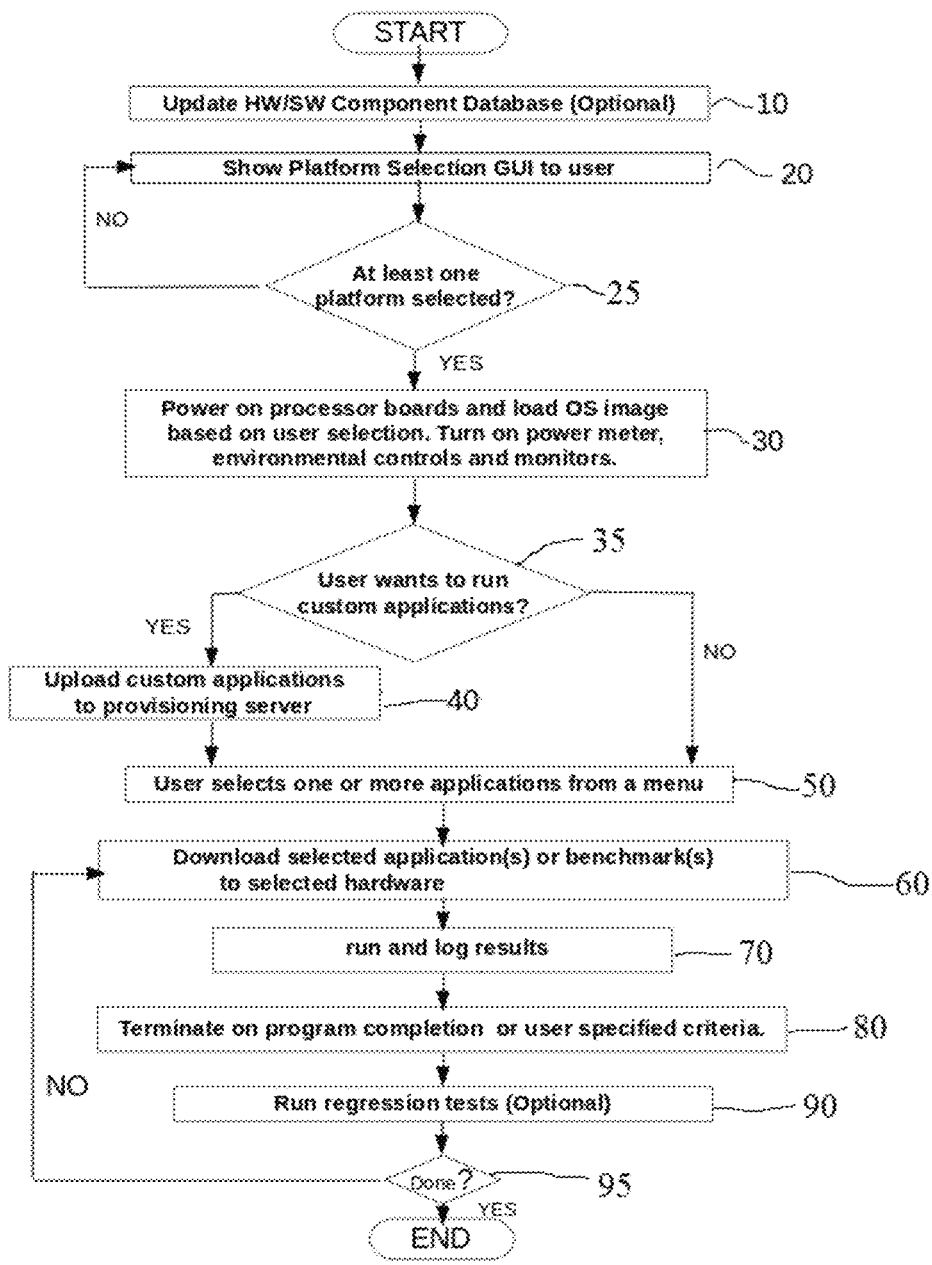
FIG. 1 is a flowchart showing operation of the selection system, according to an illustrative embodiment.

The system and method herein is adapted and arranged to find one or more optimal processing platform that meets the user requirements, where a 'platform' means the combination of the processor, any necessary peripherals and the operating system or firmware (with the latter two being referred as 'system software' in this document). Such requirements can range from hardware capabilities such as specific type and number of input/output interfaces; computing capability, measured in MIPS and/or FLOPS of the processor and/or co-processor; the operating system the processor supports; the means to program it; the required environmental parameters; price of the system or an individual component and many others. Some, but not all, of these can be found in manufacturer's datasheets, but this can be tedious and time consuming to do manually, and theoretical results may differ from actual results found using the present system. However, some of the requirements cannot be found in datasheets and must be determined empirically. These include requirements such as the amount of time a given program takes to run on a given dataset, the amount of power it consumes for the execution or the amount of latency between two events it incurs. Even if some benchmark data can be obtained from datasheets, such as worst case power consumption, theoretical maximum processing power or theoretical maximum input/output bandwidth, these numbers do not directly correlate to the observed numbers for the problem in hand. For mission-critical situations, these should be determined empirically. What makes the situation more complicated is the fact that the same algorithm can be implemented by many different means and depending on the processing element, their execution efficiency, measured in MIPS or FLOPS, can be dramatically different. An example of this would be a matrix multiplication algorithm. On a traditional processor, this would be a mostly serial implementation, whereas in a Graphics Processing Unit (GPU), it can be parallelized due to the inherent parallel nature of the hardware, resulting in faster execution in many situations. The choice of programming language, compiler, support libraries and other similar factors can make a significant difference as well.

Although a reliable means to decide if a processing system meets a given specification, and by what margin, is to do an empirical measurement on the system itself, doing so manually will be extremely time consuming and error prone, because of the sheer number of variables involved. However, more than simply automating a tedious and time-consuming task, the system and method herein addresses and solves a significant concern relating to code compatibility between platforms. Often times, even high level source code must be manually ported to optimally run on different platforms, even though they may be code compatible. Intel's Many Integrated Core (MIC) is an example of this situation. And in other cases, code written for one platform will not run at all on a different platform. For example, code written for a general purpose processor (CPU) will generally not run on a graphics processor (GPU) where it could gain orders of magnitude execution speed up in a power efficient manner. In such situations, it may be impractical to rewrite the code for the processor under test in order to evaluate it. The present system solves these problems.

FIG. 1 is a flowchart showing operation of the selection system, according to an illustrative embodiment. The system and method can include a test bed of a large number of candidate processing hardware, associated peripherals and an operating system or firmware, together called a 'platform'. The details about each platform, such as its processor type, number and types of input/output interfaces, mechanical size, etc., can be entered into a database that can be queried by a program running on the user console. This database can be created only once but may need to be updated whenever a new platform is added, a platform is removed or information pertaining to the platform changes. This optional updating is shown in element 10 of FIG. 1. At element 20, the user is presented with a list of all available platforms and can choose a set of one or more that can satisfy the design requirements. At 25 the system can determine if at least one platform is selected. After at least one platform is selected, at 30 the system can power on the processor boards and load OS image based on the user's selection at 20. At 35, the system can allow a user to indicate whether custom applications will be uploaded, and at 40, a user can optionally upload custom applications to the provisioning server. At 50, the user can select one or more applications, including optional custom applications, from a menu. At 60, the system can download selected applications or benchmarks to selected hardware. At 70, the system can run a set of one or more application programs on each of the boards for performance evaluation, and can log the results for performance evaluation. At 80, the system can terminate upon program completion or user specified criteria. At 90, the system can optionally run regression tests, if any, described more fully later. At 95, the system can check if any of the application programs part of the current evaluation remains to be run, and if so, if runs the next one.

Figure 2A:
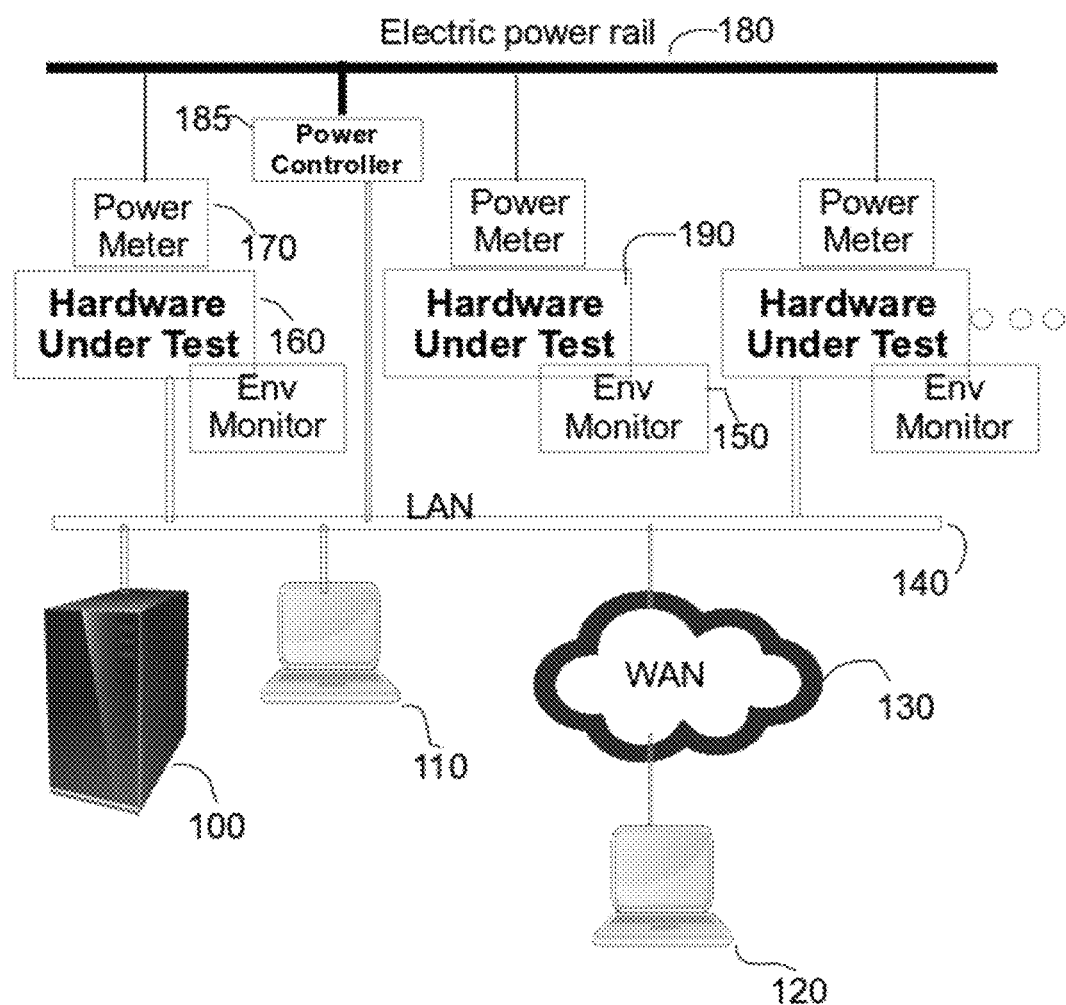
FIG. 2A is a block diagram of the selection system, according to an illustrative embodiment.

FIG. 2A is a block diagram of the selection system, according to an illustrative embodiment. The system can have a computer 100, referred to as the 'provisioning server' in this document, that has the resources necessary to control and run the setup. In particular, provisioning server 100 may power up and down the hardware under evaluation (elements 160 and 190) by commanding a power controller (element 185) to switch on or off their connection to the electric power rail (element 180), send operating system image and application programs to the hardware under evaluation and receive output data from them. It has means of uploading these software to the hardware under evaluation, when such hardware is connected to it. The system can include additional computers 110 and/or 120 (referred to, and defined as, the "user console" in this document), where the computer program that implements the system and method runs. User consoles 110 and/or 120 can show two different embodiments of the system and method. In an embodiment, user console 110 can be on the same Local Area Network segment (LAN) 140 as the boards under evaluation. It should be clear that this exemplary arrangement is only one possible configuration, and in various embodiments, computers 100 and 110 can be different modules running on a single computer or multiple computers. User console 120 represents the case where the user console is connected via a Wide Area Network (WAN) 130, possibly from a remote location. In either embodiments (or in another embodiment) a user console is able to communicate with the provisioning server. Communication between a user console 110 or 120 and the provisioning server 100 is needed to inform the provisioning server of the user's actions on the user console so that the provisioning server can control the platform under evaluation as instructed by the user. The user console obtains the database of currently available platforms from the provisioning server and, optionally, uploads any new application program to be used in the evaluation process. The Wide Area Network (WAN) 130 and/or the Local Area Network (LAN) 140 connect various pieces of the setup together. It should be clear that the exemplary set up depicted in FIG. 2A is only one possible set up, and other setups can be used without departing from the scope of the present disclosure. The environmental monitor(s) 150 can measure physical quantities such as board temperature and electromagnetic radiation as the boards run. The collected data can be passed to the provisioning server or a different computer. The system can include multiple sets of hardware under test, including, hardware set 160, hardware set 190, and/or other hardware sets. Each hardware set may (as shown in element 160) or may not (as shown in element 190) have a network interface. A power consumption meter 170 can measure the power consumption as the boards run. The power measurement data can be passed on to the same computer that receives data from the environmental monitor 150. In an embodiment, the power consumption data from the power consumption meter 170 and the environmental data from the environmental monitor 150 can be communicated to the provisioning server 100, or in various embodiments can be communicated to other computers or modules. As shown by the bubbles on the right, the hardware sets, the environmental monitors 150, and consumption meters 170 can be repeated as many times as necessary to include all desired hardware sets. Connections between the environmental monitors 150 and the power consumption meters 170 to the receiving computer can vary depending on the details of the various components. Many circuit boards have built-in temperature sensors that the system software is capable of reading and transmitting over a network. For those types of measurement devices that do not have this capability, or when a different kind of sensing is needed, another means of data communication can be used. Specific connections will be obvious to one skilled in the art. The electrical power rail 180 could be the AC mains power, a stabilized DC supply or anything else that supplies power to the boards under evaluation. The power controller 185 can be a device capable of taking a command from a host computer and switching on and off an electrical circuit that is attached to it. In this exemplary embodiment, the power controller 185 can be connected to the host via the network (LAN) interface, but other types of interconnection such as USB are also possible, as will be clear to one skilled in the art. In general, the physical parameters of power consumption, radiation, temperature, execution speed, and other significant benchmarks can be defined generally as hardware and/or software "performance characteristics" herein.

When a board has a network interface, two situations are possible: in the first situation, it is able to boot, i.e. to load system software, from a server over the network, and in the second situation, it is not able to do so. If a board does not have a network interface but has another means of connecting to a host computer and is able to boot via this interface, then it can be described as having the same capability as a board with a network interface. The methods of using this system and method will differ depending on whether a particular board is able to download a file from a host computer over some kind of interconnect or not, and if it is, whether it is able to boot itself via this interconnect or not. If the board under evaluation has a network interface that can act as a boot device, then the provisioning server can act as a boot server to each such board.

Figure 2B:
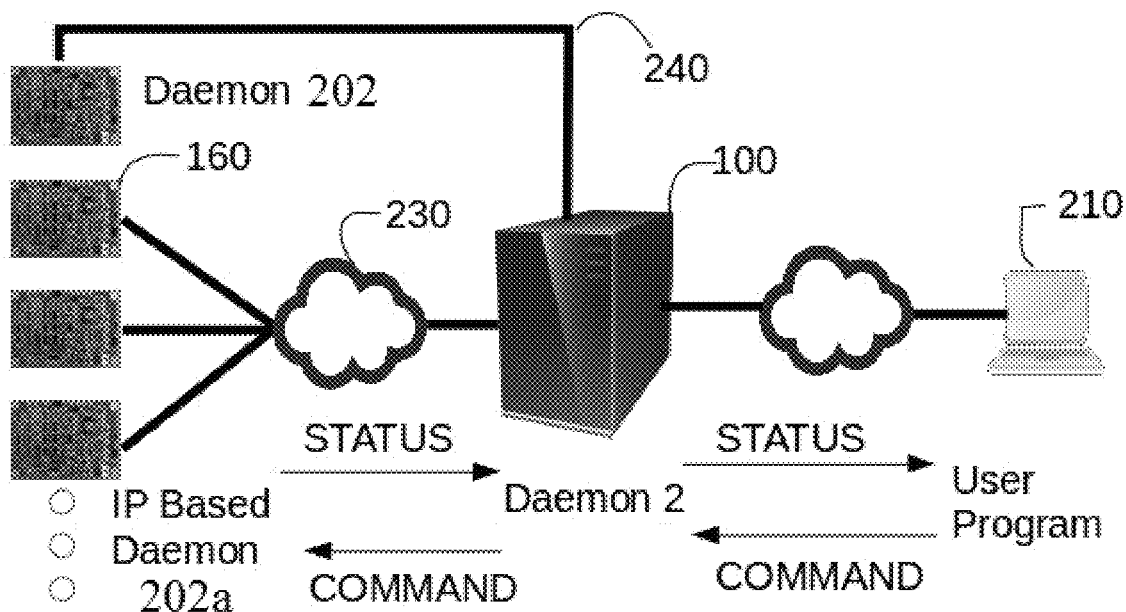
FIG. 2B is a block diagram of a selection system showing communication between components, according to an illustrative embodiment.
Figure 2C:
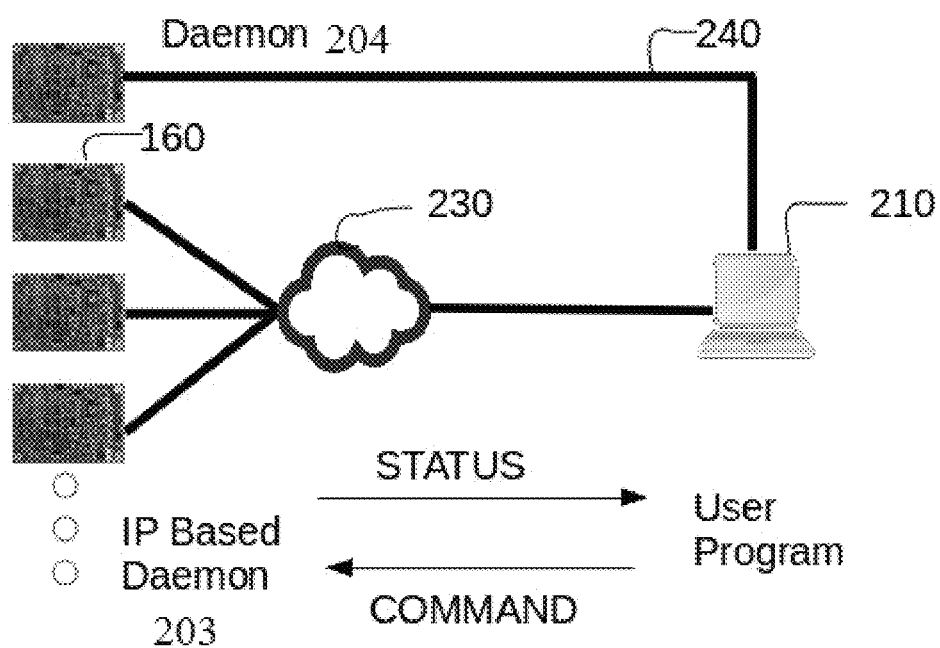
FIG. 2C is a block diagram of a selection system showing communication between components, according to another illustrative embodiment.

FIGS. 2B and 2C show two embodiments of this setup from an interconnection point of view, according to illustrative embodiments. Other embodiments are also expressly contemplated, as is discussed elsewhere in this document. In the preferred embodiment, shown in FIG. 2B, the provisioning server and each of the interconnection capable boards under evaluation can run a daemon process. When the interconnection is based on a network interface such as Ethernet, this daemon can be based on the Internet Protocol (IP). When the interconnect/communication link is some other kind, the details of the daemon would depend on the protocol that the interconnect supports, as will be clear to one skilled in the art. Unlike a network interface, there is no commonly adopted protocol standard for other kinds of interconnects, but well supported protocols for most common interconnects do exist, and the IP based networking stack itself has been ported to run on non-network hardware, an example of the latter being the Parallel Port IP for computers equipped with a PC style parallel port. The daemon running in each of the elements can serve a different role. The daemon running on the board under evaluation (Daemon 202 and/or 202a in FIG. 2B; Daemon 203 and/or 204 in FIG. 2C) can run a state machine that informs the other end about the current state of the board such as if it is ready to accept a new command, if an application is currently executing, etc. It can also receive application program files and associated data from its peer and passes status and output messages to its peer. Daemon 202 and Daemon 203 are IP based whereas daemon 202a and 204 are based on non-network interconnects. Because network interfaces are commonly found on processor boards and the IP based networking stack is commonly supported on most system software, the IP based daemon can be preferable over another interconnect. The daemon running on the provisioning server can receive the state update messages from each of the attached boards under evaluation and can maintain information about state of each board. It can also accept commands from the program running at a user console 210 and can relay status and output messages from each board to the user console 210 when required. Communication can occur using network 230 and/or non-network based communication mechanism 240 between the boards under test and the host computer. This could be any protocol based bus such as U.S.B, I2C, etc. or a set of General Purpose Input Output (GPIO) lines.

Figure 2D:
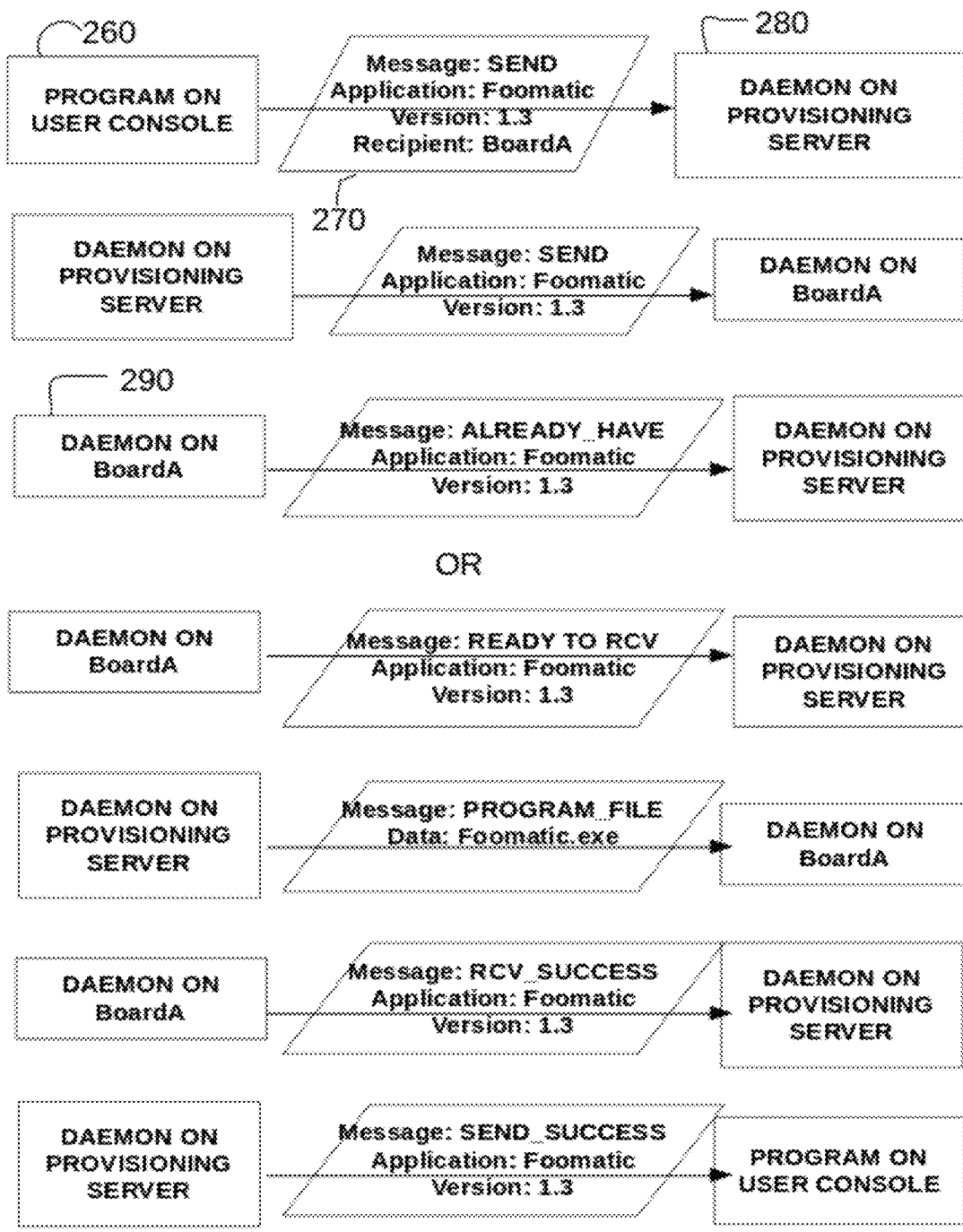
FIG. 2D shows an example of a message exchange protocol that can be used to distribute executable application and associated data files to the boards under evaluation, according to an illustrative embodiment.

FIG. 2D shows a typical message exchange between the program running at the user console, the daemon running on the provisioning server and the daemon running on each board, according to an illustrative embodiment. The program 260 running on the user console passes the user commands at 270 to the next daemon, which, in the embodiment shown in FIG. 2B, is the daemon 280 running on the provisioning server, but can also be the daemon running on the boards under evaluation as shown in FIG. 2C. If a daemon running on the provisioning server receives the command, then it can pass it on, after appropriate modifications, to the daemons 290 running on each of the boards under evaluation that are attached to it over the network. One advantage of using the provisioning server as an intermediary is that it can be a high end server storing many different operating system images and application programs serving multiple boards while the user console can be a low computing power device such as a laptop computer. The daemons running on each of the boards can optionally verify the command and data that was sent to them by recalculating a checksum, execute the command and send the status and, optionally, any other output to the same daemon where they received the command message from.

Figure 3:
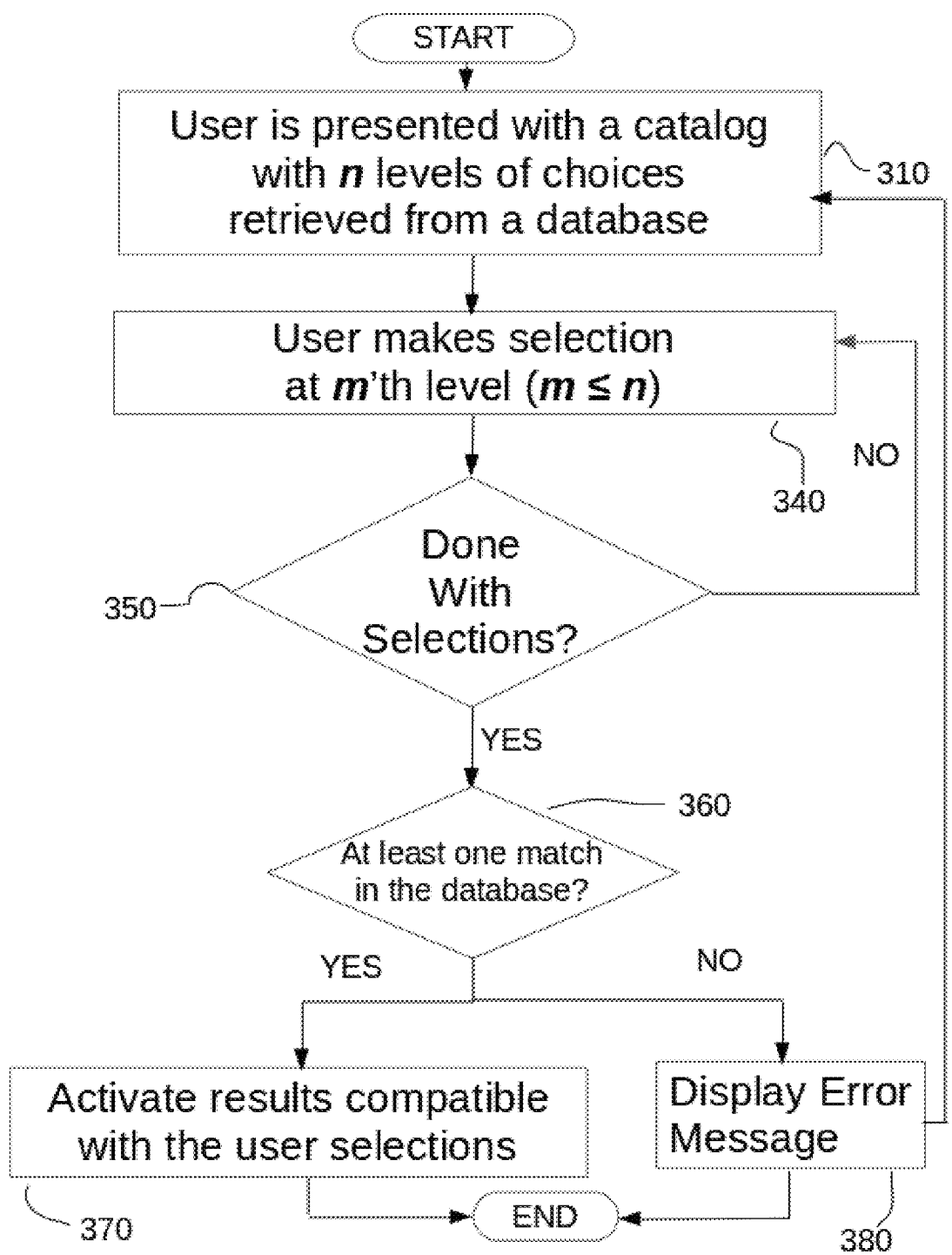
FIG. 3 is a flow chart showing a constraint selection process, according to an illustrative embodiment.

FIG. 3 is a flow chart showing a constraint selection process, according to an illustrative embodiment. At 310, the user can run a program on the user console and can be presented with an interface (preferably graphical), which shows the entire set of platform choices available to the user. This can be done by pre-populating a database with all pertinent information about the available platforms and querying this database from the program. Whenever a new platform is added or an existing one is removed, the database can be updated to reflect the change, as shown in FIG. 1 at 10. At 340, the user can then start imposing the constraints that are organized into multiple levels. These constraints are dictated by his/her design. The constraints imposed at each stage narrows down the choice of available platforms for the next stage. This process continues until no more constraints are left or until the set of platforms satisfying the constraints have zero members. At 350 the program running at the user console checks if the user is done specifying constraints. At 360 it checks if the set of platforms satisfying all the constraints have at least one member. Any of the platforms that have satisfied all the criteria can potentially be used for the design. At 370, the user can run an empirical evaluation to find the best among them. This is where the user can narrow down the platform selection by inputting constraints that are based on the requirements of the system they are designing. If no platforms matching all the constraints were found, as shown at 380, then the user can either go back and select fewer constraints, a different set of constraints or abandon the process altogether.

Figure 4:
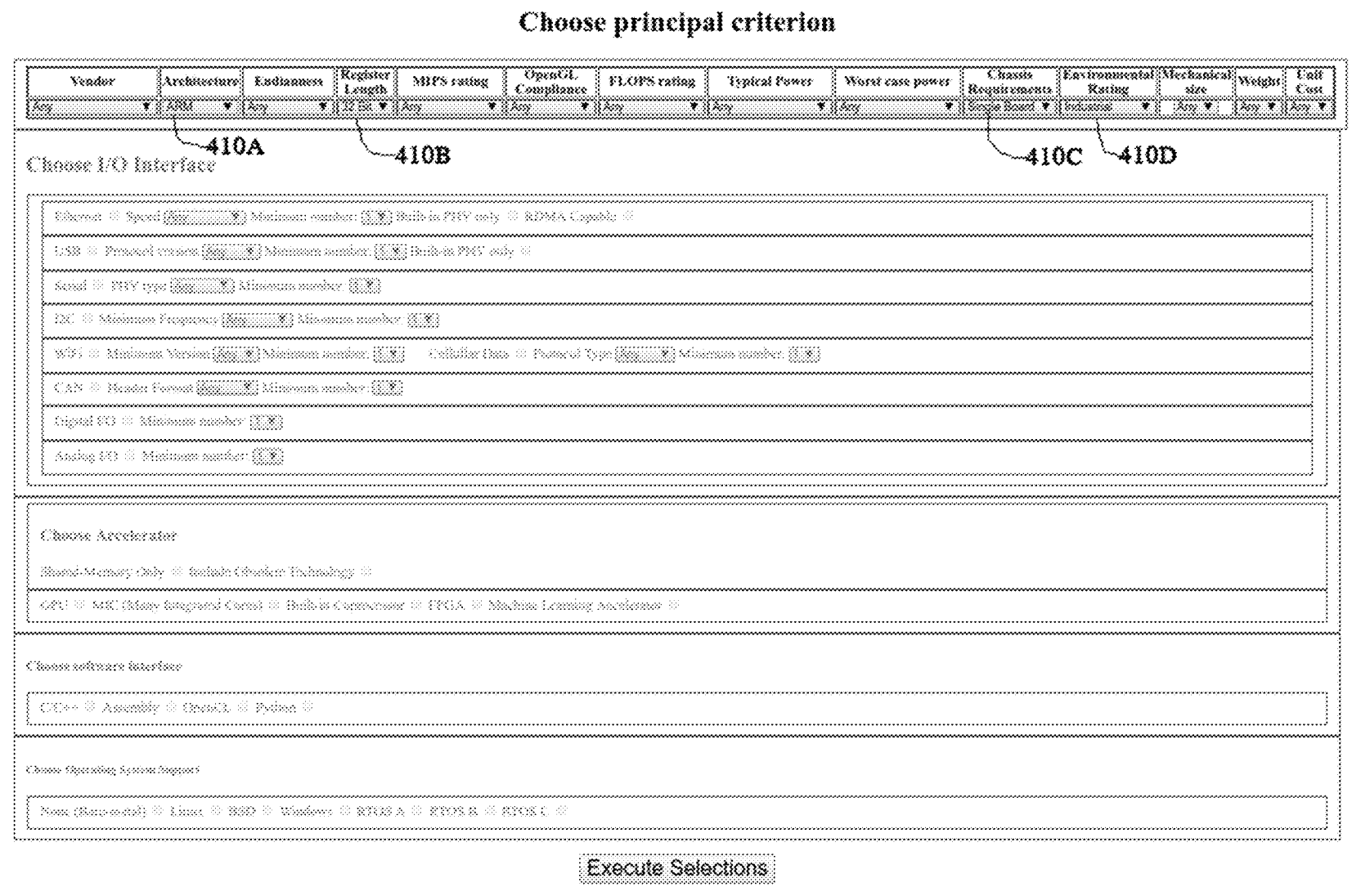
Figure 5:
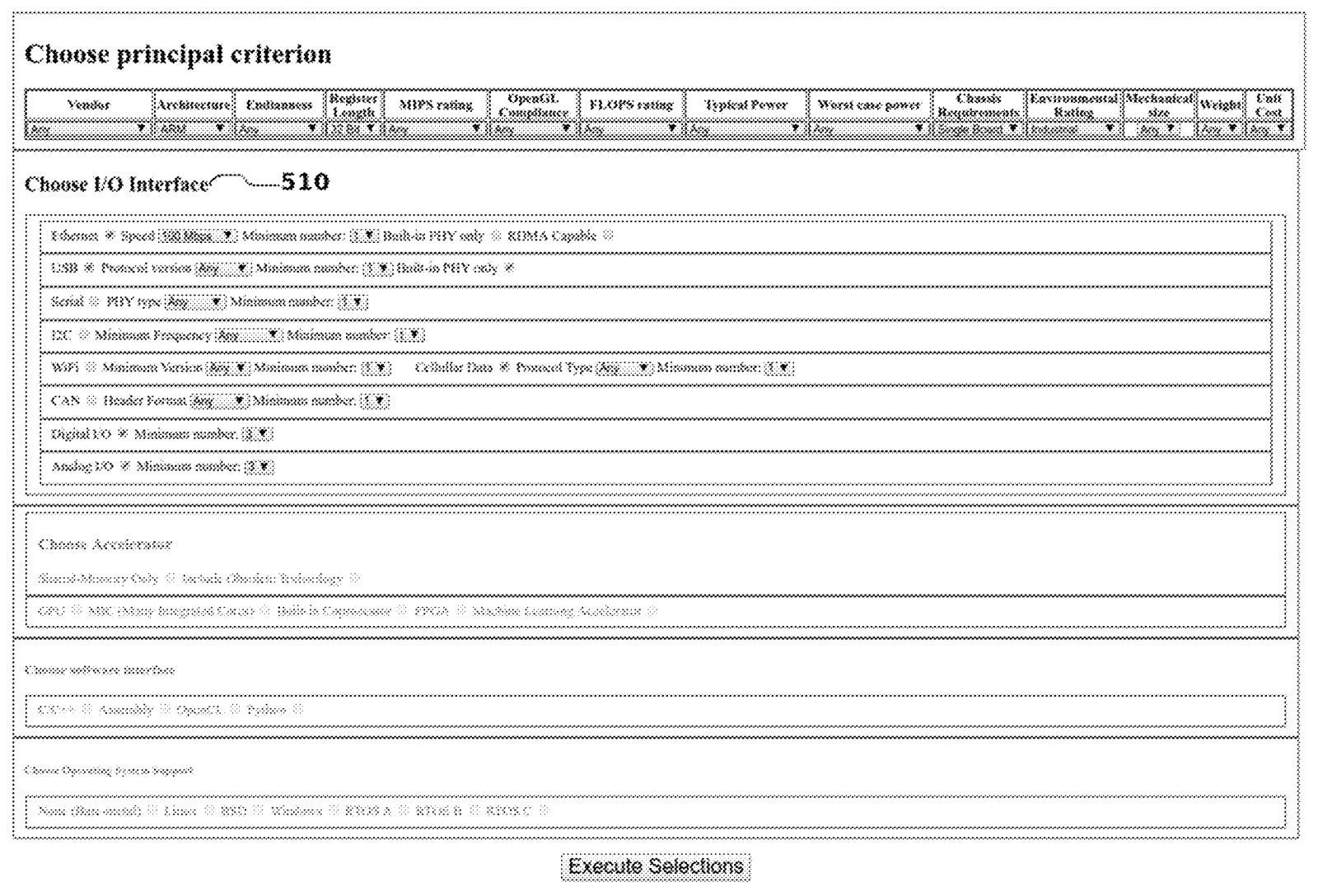
Figure 6:
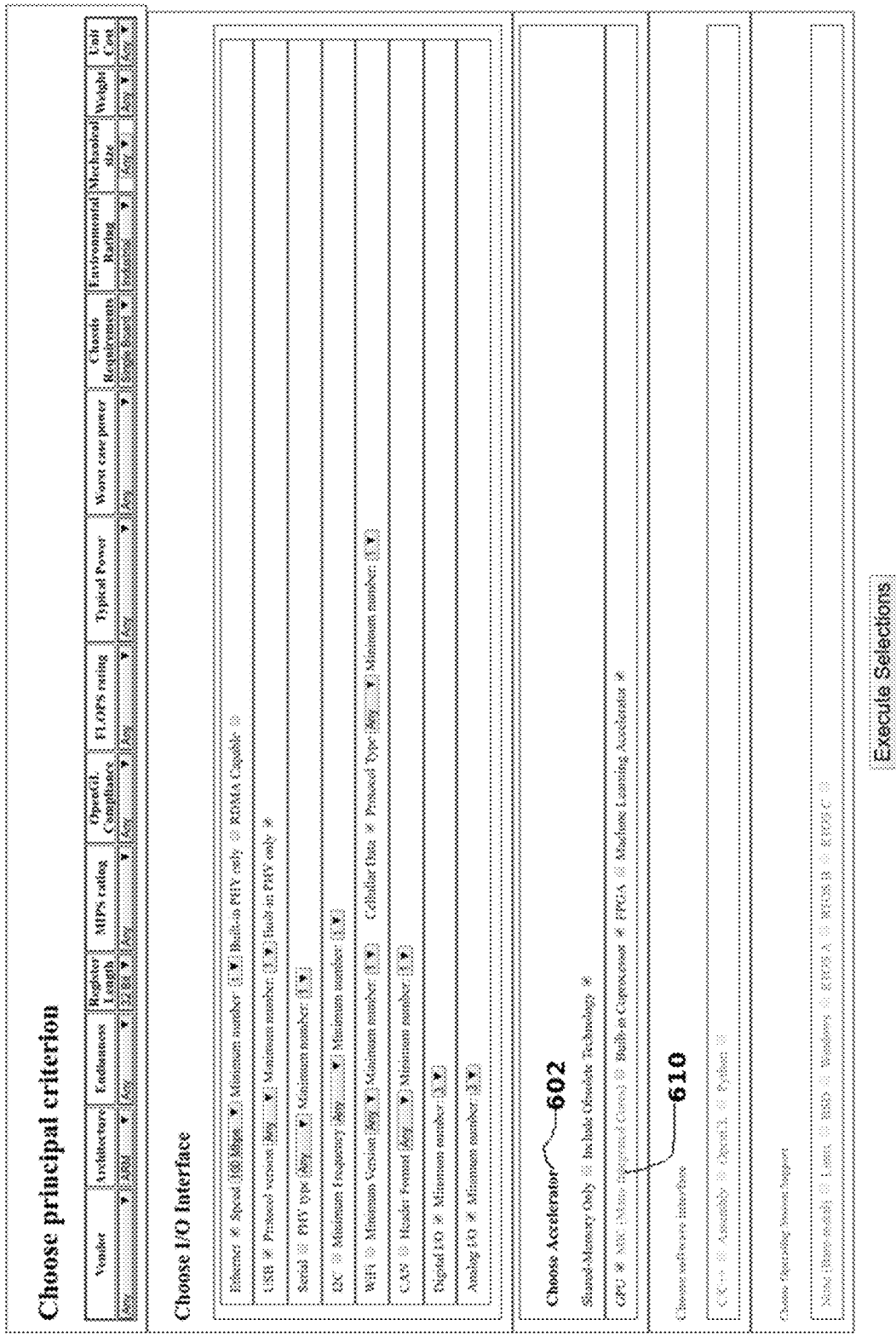
FIG. 6 is a graphical user interface showing the selection of the compute accelerators, according to an illustrative embodiment.

A prototype implementation of this flowchart as a workflow is shown in FIG. 4-FIG. 8. It should be expressly noted that the exemplary workflow described in FIGS. 4-8 is by way of example only and that an actual implementation of the system and method by a user can be highly variable depending upon the particular hardware under test, associated software and desired parameters/variables being operated and/or tested by the user. The user interface allows the user to choose the parameters required for the system they are designing, or, alternatively, impose constraints on the systems available on the test bed. This can be done in several stages, with each stage narrowing down the list of possible candidates. In an embodiment, the number and order of stages and details of each stage may be different from the figures shown. In one improvement over the prior art, the choices available to the user, at any stage of the selection process, are consistent with both the prior choices made in the same session and with the entries of the database. This can ensure that the user is unable to make a selection that cannot be realized, either because it involves contradictory constraints or no matching hardware/software selection is present in the database. The hypothetical workflow shown in FIG. 4-FIG. 8 has five stages. The first stage, shown in FIG. 4, chooses the primary design requirement. As shown in FIG. 4, the design requirements must have an ARM processor, selected in the architecture selection box 410A, with 32 bit register length, which has been selected in in register length selection box 410B, as a single board computer, which has been selected in chassis requirement selection box 410C, capable of industrial temperature range, which has been selected in environmental selection box 410D. FIG. 5 shows the next step, where the user can choose the I/O requirements in the I/O interface selection box 510. FIG. 6 shows the next step where the compute accelerator may be chosen. A choose Accelerator box 602 can allow the user to select from possible options, and the user can be prevented from selecting incompatible options because incompatible options can be disabled from being selected, e.g. 'grayed out.' In this example use case, it is assumed that the 'MIC (Many Integrated Cores)' 610 selection of this step is incompatible with the choices made in the earlier steps. Thus the corresponding entry is disabled, as shown by the graying out of MIC 610, thus ensuring consistency of the selection process, as was discussed earlier. The next step of the process, shown in FIG. 7 allows the user to choose one or more software interfaces, using software selection box 702. In this example, the user has chosen the C/C++ 704 and OpenCL 710 interface. The final step, shown in FIG. 8 allows the user to choose the system software. The user can select from the options shown in the operating system selection box 802. In the example shown, it is assumed that the selections of 'RTOS B' 810A and 'RTOS C' 810B would be incompatible with the prior user selections. The corresponding incompatible entries shown in the user-interface are disabled to reflect this and thus the fact that at any stage, the selection process remains consistent. The entries that are enabled are shown in black. Unless it would cause a consistency violation, a stage may be skipped. In such cases, the generated list will be the same as if all the elements of that stage was chosen. Selections can be completed in any order, and can be changed after making selections in different boxes. The program running on the user console can then automatically choose those choices from the list of parameters of unselected items that does not contradict any choices explicitly made by the user. FIGS. 4-8 are meant to be taken as an example only, and only very few possibilities out of many are shown. In various embodiments, there could be different number of steps in this stage, the order of the steps could be different and the number of options available in each step could be different.

Matching the digital input/output (I/O) requirement of the design to the I/O pins available on the processing device can sometimes be challenging. Although manufacturers often advertise a large number and type of digital I/O interfaces on their chips, not all of them are available for use at the same time. Many I/O pins are shared between different buses. Same can be said about analog I/O as well. A chip may have many analog I/O pins sharing one or a few Analog-to-Digital (ADC) and Digital-to-Analog (DAC) converters. Accordingly, the full bandwidth of the ADC and DAC may not be available to all of the pins. An optional feature of the program running on the user console is to act as a 'fitter' and map the protocol bus requirement (e.g. 2 I2C buses, 1 SPI bus and 3 GPIO lines) to the individual I/O pins of the chip, and report on the fraction of I/O resource of the chip that was utilized in the design, as shown in column 930, explained more fully below.

Figure 7:
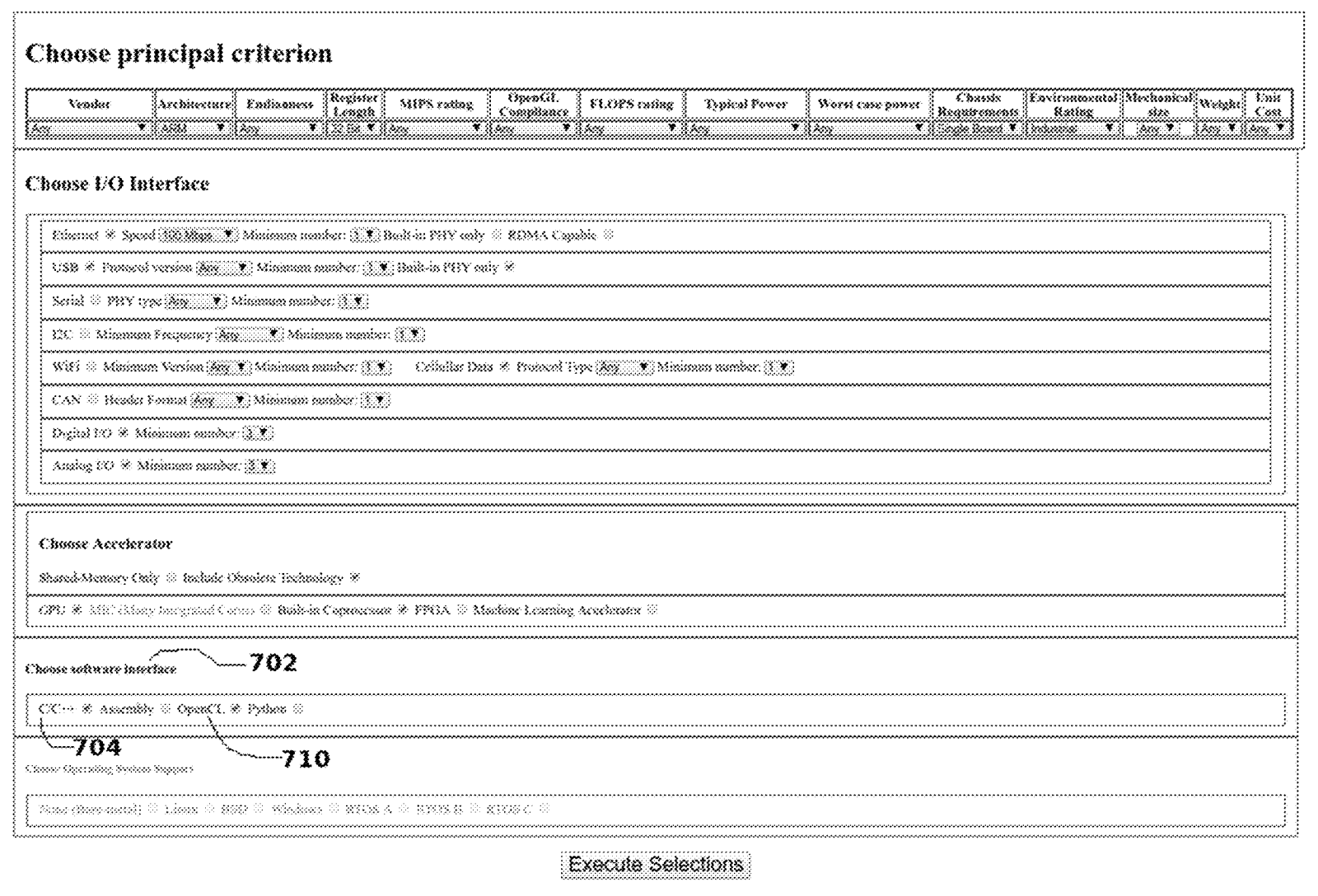
Figure 8:
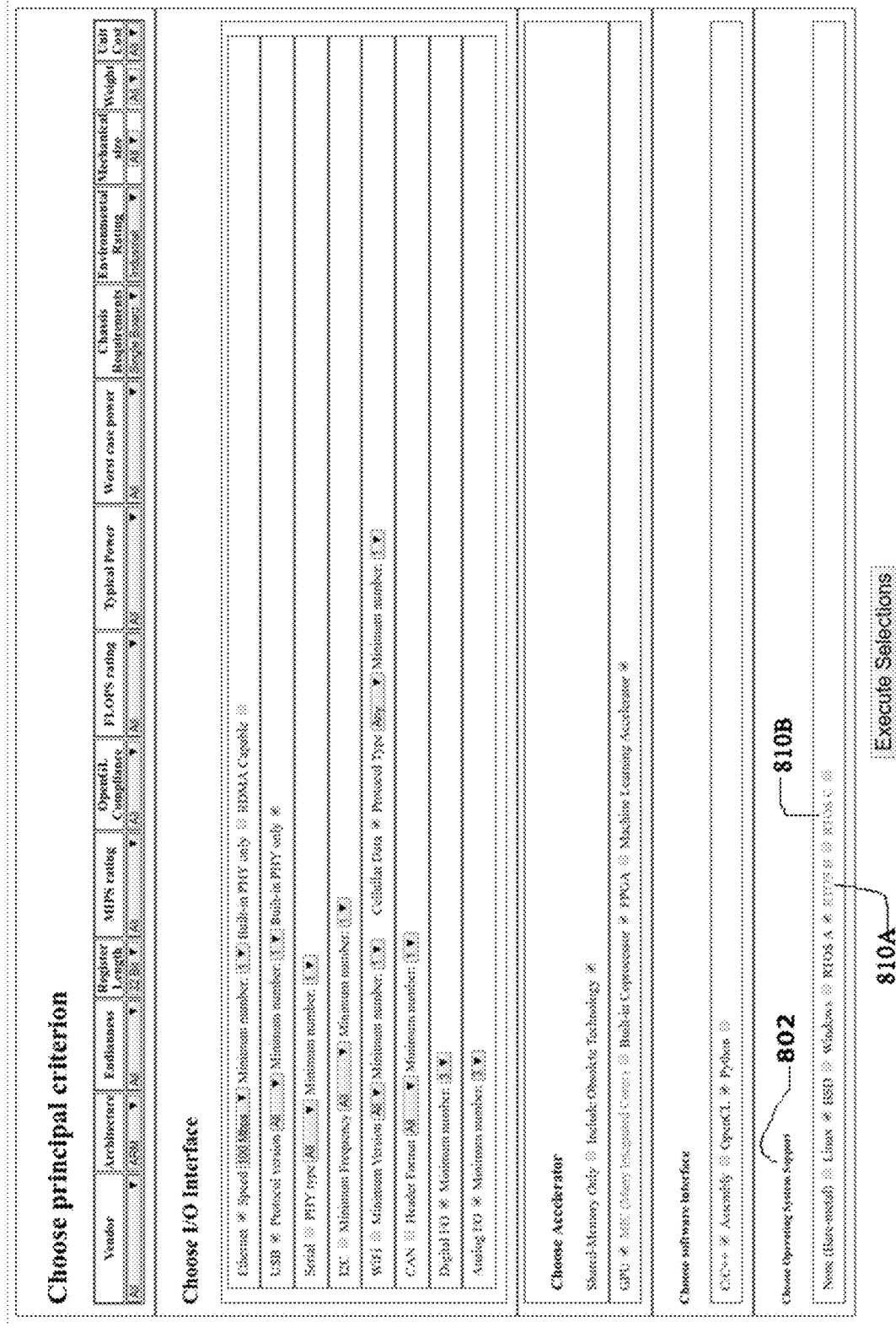
FIG. 8 is a graphical user interface showing the selection of system software, according to an illustrative embodiment.
Figures 9, 9A:
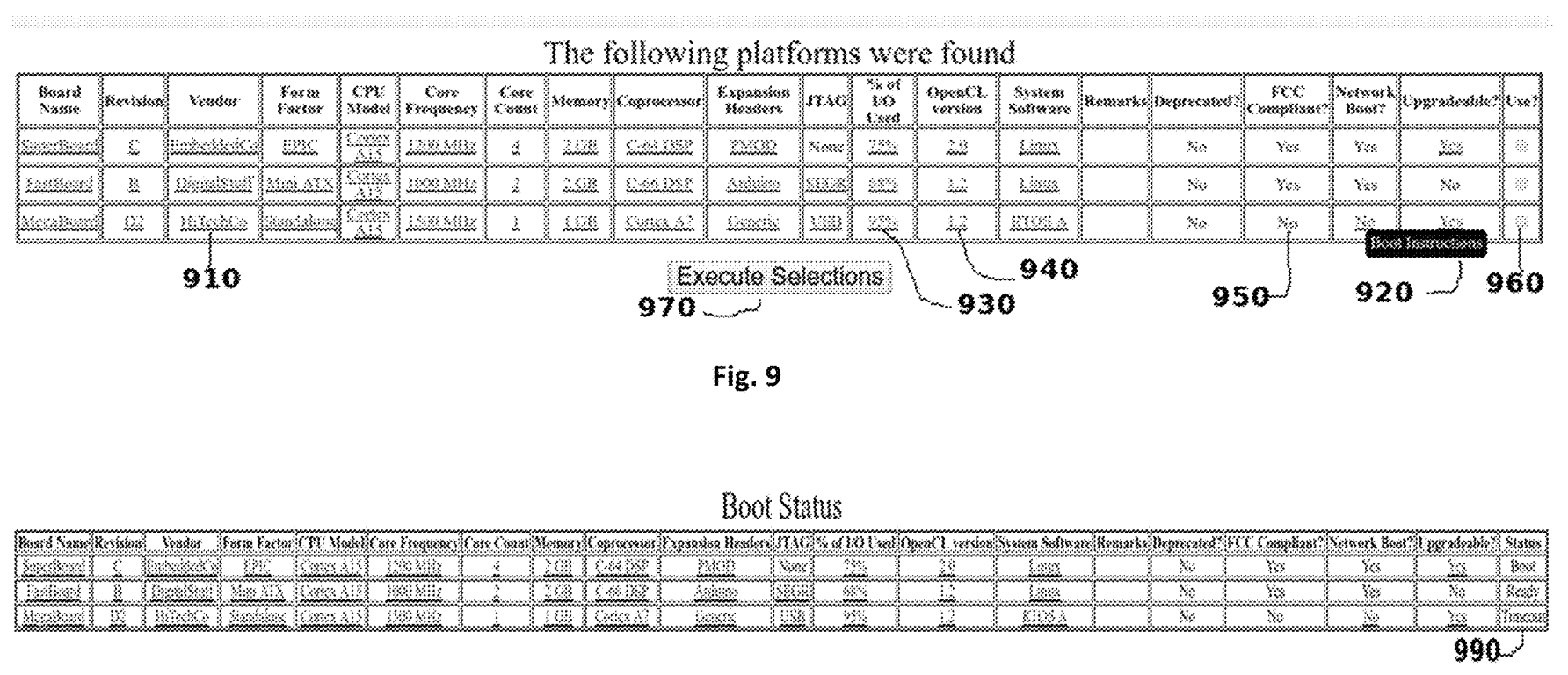

FIG. 9 is a screen showing an exemplary result the user would see after completing the constraint selection process, according to an illustrative embodiment. Once all the stages of the constraint selection workflow have been completed, a list of candidate processing systems satisfying those constraints can be generated, as shown in FIG. 9. Hyperlinks 910, which can be an optional feature, can provide a hyperlink to additional data provided by the vendor. The user can click this hyperlink 910 to access this additional data. The type of this data can depend on the context. For a specific board, it could be a datasheet for the board; for a revision, it could be a revision history; for a processor core type, it could be the software interface for that core and so on. Help bubbles 920, which are optional, can show what kind of additional data is available at the hyperlink. I/O percentage column 930, which can be optional, shows the result from an input/output (I/O) pin fitter, in case those type of constraints were chosen by the user. This can map the I/O pins of the processor to the I/O constraints that were specified by the user and report on the fraction of I/O pins that were used to satisfy the constraints. The data included in the output shown in FIG. 9 can depend on the constraints chosen by the user. An example of this is the OpenCL Version information 940, which can be optional. In FIG. 7 and FIG. 8, the user had specified that they want to use OpenCL as a programming interface, (as shown at 710 of FIG. 7), and thus, the versioning information about OpenCL compliant hardware was generated and displayed. Had the user not chosen the OpenCL option, this output would not have been generated. Plain text 950 can indicate that for those data shown in plain text, instead of a hyperlink, no additional information is available. Checkboxes 960 allow the user to include the platform shown in that row in the application software evaluation. Execute button 970, which could be another form of user interface element, allows the user to end this selection step of the process and proceed to the next step. This figure serves as an example only; in various embodiments, the number of rows in the table, the number of columns in the table and their order could be different.

Figure 10:
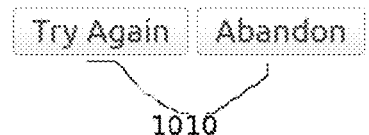
FIG. 10 is a screen showing an exemplary result the user would see if no entry in the database would satisfy all the constraints, according to an illustrative embodiment.

If none of the available platforms could satisfy all the constraints, then the user is notified of this fact, for example, with the error message shown at 380 in FIG. 3, at which point (s)he may go back to the previous step and impose fewer or a different set of constraints or abandon the process altogether. FIG. 10 shows an exemplary result the user would see if no entry in the database would satisfy all the constraints, according to an illustrative embodiment. In this case, the user can have the choice of going back to the previous step and try imposing fewer constraints, a different set of constraints, or abandoning the process altogether, as shown by selection options 110. All of the platforms shown in FIG. 9 satisfy all the user constraints, but, as an optional feature, the user does not necessarily need to evaluate all of them. At this stage the user gets another chance to use checkbox 960 to narrow down the choice of platforms selected for evaluation. The user can make this decision after seeing all the information that the program has generated as shown as an example in FIG. 9, or the user can consult any additional document available from the hyperlinks 910. After making the selection, the user must activate a user element, such as execute button 970, to complete this stage.

Figure 14:
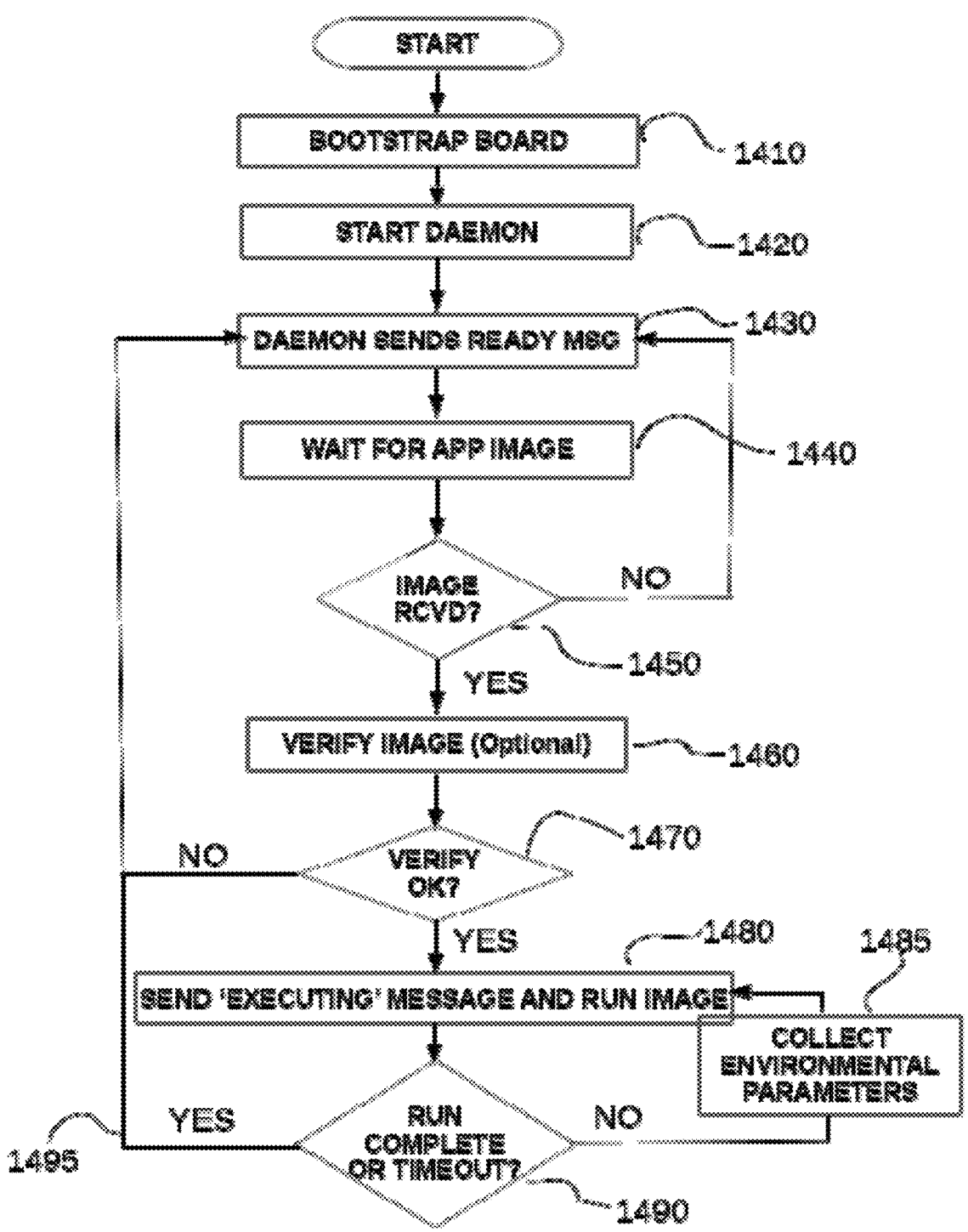
FIG. 14 is a flow chart of the application execution mechanism as a state machine, according to an illustrative embodiment.

FIG. 14 is a flow chart of the application execution mechanism as a state machine, according to an illustrative embodiment. After the user chooses a set of platforms in the last step, two events can happen, and they can happen in parallel to the extent it is practical. At 1410, the program running at the user console can send a message to the power controller to power on the selected hardware. This message could be sent directly from the user program or routed via the provisioning server. The details of the message format depends on the programming interface of the power controller used. This would cause the boards to attempt to boot. For those boards that are capable of booting over a network, network boot can be the preferred means of booting. The boards can request a boot image from a pre-assigned IP host that can be the provisioning server. In various embodiments, if possible, the board can be booted over another form of interconnect common to itself and a host computer. If the board has no remote boot capabilities at all, or remote booting is not desirable for some reason, then the boot image may need to be copied to a boot device locally attached to the board. Although the boot process for such cases cannot be controlled programmatically, the program on the user console can still help by optionally providing boot instructions via a hyperlink. At 1420, after the completion of the boot process, each board can start a daemon process, as shown in FIG. 2B, 2C, and FIG. 2D. At 1430, the daemon can send a 'ready' message to a predefined host, which can be the provisioning server, and can enter a loop as shown in FIG. 14. The first step of this loop can be acquiring an application image to execute, as shown in 1440. If this is not received within a predefined time, the daemon can send another ready message and can reenter the wait as shown in 1450. This provides robustness against any missed messages on either side of the daemon. If the application image contains an optional checksum, then, at 1460 it can be verified to ensure authenticity and integrity of the image. An application that has an invalid checksum may not be executed, as shown in 1470. In order to indicate invalidity of the checksum, the daemon on the evaluation board can send a 'ready' message to the provisioning server, instead of an 'executing' message. But another type of message to signal checksum failure could also be used. If the checksum was successfully validated, then at 1480 the daemon on the evaluation board can send an 'executing' message to the provisioning server and can start executing the application. As the application runs, data from environmental sensors 150 and power consumption meter 170 are periodically collected as shown in 1485. Each time sensor data is gathered at 1485, an optional 'executing' message can be sent. These repeated 'executing' messages provide robustness of the state machine at the provisioning server (described in the following) against lost messages, and can also serve as an indication of progress. A limit on maximum allowed execution time can be globally specified or can be specified per application, for example, using the message exchange mechanism shown in FIG. 2D. The daemon on the evaluation board can monitor the execution time of the program and if it exceeds the maximum allowed time, the daemon can terminate it. At 1490 the daemon can check to see if the application has finished executing, either due to normal program completion or termination due to timeout. If it has, then at 1495 it can send a 'ready' message to the provisioning server indicating it is ready to execute the next program.

The provisioning server can maintain a state machine for each of the boards that was selected to boot with exemplary states being 'BOOTING', 'READY', 'EXECUTING' or 'TIMEDOUT'. The provisioning server can initialize the state to 'BOOTING' and wait a reasonable amount of time (three times the expected boot time in an embodiment) to get the 'ready' message from the board, and, upon receiving such message it can transition the board to 'READY' state. If the 'ready' message is not received in a predetermined amount of time, the board is transitioned to 'TIMEDOUT' state and is not used in the remainder of the evaluation process. This would account for situations like defective or non-existent hardware. Various embodiments to implement this state machine are possible. One embodiment could include pinging the board on an IP network or to use a similar mechanism for another interconnect. Other mechanisms achieving the equivalent effect are also possible. If the board is not network capable, as is the case for many microcontroller boards, an alternate means of signaling readiness should be made available. This could be done in many different ways depending on the details of the board. A typical example is described in the following: one or more unused General Purpose Input Output (GPIO) pin(s) of the board under evaluation can be connected to a GPIO card on the host computer (e.g. the provisioning server), and a predefined code can be sent over these pin(s) as a status message. Any protocol based bus common to the board and the host computer, such as SPI or I2C could also be used instead of GPIO pins. FIG. 9A is a screen showing the status of the booting process after the step shown in FIG. 9 is executed, according to an illustrative embodiment. The example of boot status display depicted in FIG. 9A can include information shown in FIG. 9, and can also include boot status display 990. The second of the two events mentioned above is that while the boards are in the process of booting up, the user can be asked to choose a set of application programs to run on them, described more fully below.

Figure 11:
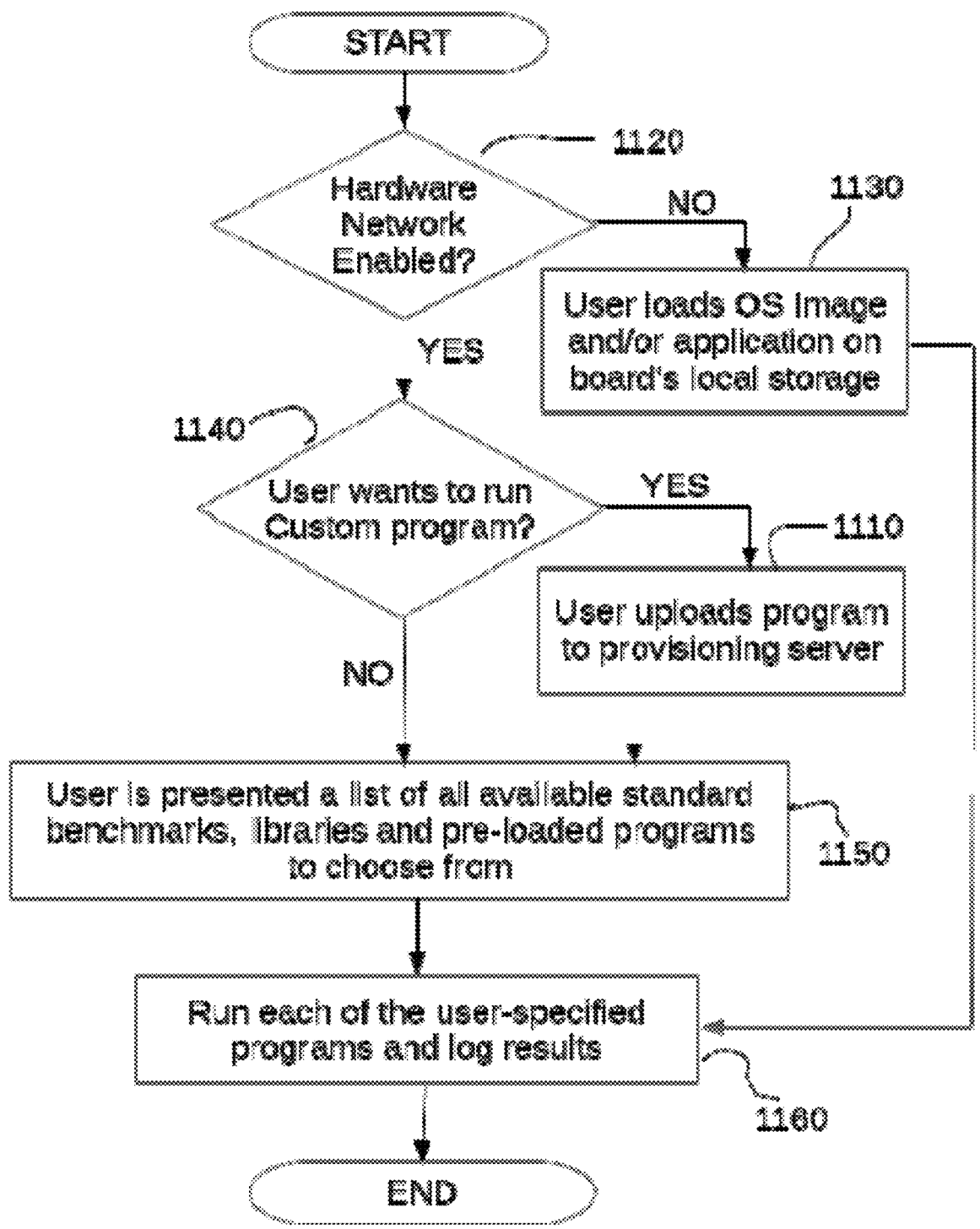
FIG. 11 is a block diagram of a process for choosing application programs for the platforms that were selected in the previous steps, according to an illustrative embodiment.

The application program to be run on the boards could be a custom program written in a high level language that may need to be ported to the target architecture before it can be run or it could be a set of pre-ported programs ready to run. A flow chart outlining the process is shown in FIG. 11. At 1120 a check can be made to see if the board under evaluation has an interface that can be used to download the application program from the provisioning server. If the board does not have this capability then at 1130 the user can be required to copy the system software and application programs to a storage medium local to the board for execution. At 1140 a check is made to see if the program to be executed is new to at least one of the boards under evaluation. If that is true then at 1110 the user can be required to upload it to the provisioning server from where it can be downloaded by a network-enabled board. Once a new program is uploaded to the provisioning server, it is added to the database of application programs with other attributes such as the platform it runs under. For subsequent runs, this program would be available as an option. FIG. 12 shows an example of the upload interaction. This user interface can ask the user about all the pertinent details about the executable, such as the details about the processor architecture and the operating system it runs on in selection boxes 1220. The filename of the executable can be entered in the 'App Name' box 1210. Software running on the provisioning server can then update the database with information on the newly added software.

This is where the issue of code compatibility may come to play as the list may potentially contain processors of different architectures. The user can choose to rewrite their code for each of these architectures. While this will make the test results most reliable, this would be impractical in many situations. This problem can be overcome using either of two solutions described below.

Often, the nature of the code execution, such as if it is memory bound, CPU bound, I/O bound or something else, and where the execution hotspots are, are known from profiling the code in any platform where it currently runs. Running a set of readily available pre-ported benchmarks that only benchmark the set of known bounds of the executable often provides results of acceptable accuracy, while saving a large amount of time and effort that would be needed for code porting.

The second optional solution includes collecting a set of software libraries optimally implementing the core algorithms for each of the architectures. Often times these libraries are available from the processor vendor. The hotspots of the application, at the algorithm level, are generally known and can be further verified by profiling the binary executable in a processor where it currently runs. A benchmark of the core algorithms of the application can then provide a performance metric of the target processor of a sufficient accuracy. This benchmark can be easily created by invoking the public routines in the core software libraries from a few lines of high level source code to create an executable program. The Fast Fourier Transform (FFT) can be taken as a specific example to illustrate the point. Most vendors of generic processors and specialized compute accelerators provide libraries implementing the FFT and other common algorithms highly optimized for the specific hardware. As an example, if it is known, by run-time profiling, inspection of the source code, or by another means, that to run the program on a given dataset 1 million complex FFT of 1024 points each are needed, and this is where most of the computational effort is spent, then using the vendor provided library to calculate the equivalent number of FFTs on the same dataset can provide a performance metric of the target processor that can be a sufficient approximation with a very small amount of effort.

The two alternative solutions, along with the possible solution of running the ported original application, are shown, as a hypothetical example in FIG. 13. In practice, this can be a complete list of all of the executable programs that can run on the chosen platform and it can be up to the user to narrow down the list, if desired. This narrowing down can be done by choosing to include or exclude each application using checkboxes 1320. If there is a pre-run checklist (such as a reminder to connect any necessary peripherals before application execution), it can be listed here with an optional hyperlink 1310 and/or 1510 to the checklist document. If the application is accompanied by any regression and/or post-run cleanup scripts, those can be shown here and the user can choose to include or exclude them using checkboxes 1330.

After having chosen a set of applications to carry out the evaluation process, the user activates a start button 1340 to start the execution. The entire sequence of events is shown in FIG. 14. Although the command can be issued at any time, the actual execution, where the code must be downloaded from a server, is not started until the state of the board has transitioned to the 'READY' state. For those boards that lack connectivity to a server, the application program(s) stored in a local device can start executing automatically after boot up. Even for such devices, a status and progress indicator can be obtained in most cases, as is described elsewhere in this document. It will attempt to run the applications in parallel across multiple boards whenever possible, unless situation such as dependencies, licensing for the application software or other similar causes make such parallel runs unfeasible. Each of the application can be optionally accompanied with a checksum or a digital signature. If such a checksum or signature is present, it can be verified before the application is executed. Once all the requirements for the application execution have been satisfied, the daemon on the board under evaluation can send an 'EXECUTING' message at 1480 to the provisioning server and can start running the application. The provisioning server, upon receiving this message, can changes the state of the board from 'READY' to 'EXECUTING'. During application execution, the daemon running on the board under evaluation can collect environmental parameters from the appropriate monitors, such as environmental monitor 150 of FIG. 2, and power consumption information from the power meter, such as power meter 170 of FIG. 2. The means to collect this information is not shown in the diagram as it will vary depending on the power measuring mechanism and environmental monitoring sensors. Some hardware under test may have built-in thermometers in the boards and the system software usually has the ability to report this information over the LAN. Power consumption measurement may also be built into some boards. In those situations where external measurement devices need to be used, the details of collecting data from these depend on the measurement device and is out of the scope of this system and method, except that an arrangement can be made so that the daemon running on the provisioning server can get this data when needed.

FIG. 15 is a screen showing the status indication on the user console as the test applications are executed, according to an illustrative embodiment. The status column can include an optional hyperlink 1510, that can show when additional information, such as a pre-run checklist is available. This information can be downloaded via hyperlink 1510, and a brief description about the additional information may be provided via a bubble help.

The execution of application programs could produce output or error messages. If the board is connected to a host computer via an interconnect/link such as an IP network, then those messages are logged to an IP host, which can be the provisioning server. By way of non-limiting example, a means of accomplishing this could be the following: the daemon process running on the board under evaluation and its peer daemon running on the provisioning server can open a Transmission Control Protocol (TCP) socket to each other and thus establish a stream based network connection between the two. More than one such TCP connection can be used. For example, one connection can be used for output messages and one for error messages. Then the daemon on the board under evaluation can write a copy of the output message, error message or similar logs to the appropriate TCP stream which can then be received by the provisioning server and logged. Another example means of the above would be to use the 'syslog' mechanism available on many Unix-like operating systems. Other mechanisms are also possible depending on the interconnect type, as will be clear to one familiar with the art. If the board is not connected to a host computer but has enough writable local storage, messages can be stored in such local storage. In addition, if the board has a console, it can be sent to the console output as well. In addition, execution of application programs could produce side effects such as LEDs being turned on or off, activity happening on devices connected via input/output buses of the board and so on. The means of recording these output is specific to each situation. In some cases, simply watching an LED or a motor drive for activity may be sufficient. In some other, watching oscilloscope or logic analyzer traces of bus activity may be needed. In yet another, the data being sent to a separate device over an input/output bus may need to be recorded on the remote device, the board under test or both.

The progress of the test runs, to the extent possible, can be shown on the user console. Getting this information from boards with a network interface is easy with Internet Protocol (IP) based communication. A TCP based connection, as was described earlier for message logging, can be used. A User Datagram Protocol (UDP) based connection would be more scalable for this purpose as status messages do not require the level of reliability as log messages and thus UDP may be preferred over TCP. In case of primitive microcontroller boards without a network interface, progress indication information can generally be obtained in several ways. One example is to use one or more General Purpose Input Output (GPIO) digital line(s) on the board under evaluation that are left unused by the running application. If the application running on the board or an external agent writes to these line(s) at predetermined intervals and this is read by the provisioning server on the other end, a measure of progress can be obtained. This could be done from the timer interrupt of the board under evaluation, from pre-defined synchronization points of the running application or any other means. This means can be similar to, but not necessarily identical with, communication mechanism 240 of FIGS. 2B and 2C. For those boards where even this is not possible, progress monitoring may need to be done manually and the program on the user console can communicate this. A typical example of what this may look like is shown in FIG. 15.

Turning back to FIG. 13, the post application-run regression tests 1350 may not always be as straightforward as comparing a set of numbers for equality, for several reasons. For one, if the calculations involve floating point numbers, because of slight differences in the implementation of floating point execution units, different processors may generate results that are slightly different from each other from the same set of input data. For another, the computation may involve external input, as in an industrial system, that can be different from time to time. The regression tests are designed to take these variability into account and generate reliable pass/fail results to ensure that the software that ran on different platforms were consistent. This provides validation (a sanity check) against operator errors, a misconfigured database etc., besides other uses cases. Also, since the user can potentially reconfigure the processor in cases where such reconfiguration is allowed, e.g. in microcontrollers and reconfigurable hardware such as FPGAs or CPLDs, a set of regression tests can be run to verify the operation of the I/O pins as well. This can be particularly valuable in situations where the choice of processing elements is confined to one family so that the processing cores are substantially similar and most of the difference lies in the peripheral devices.

There can be two components to the regression tests. Depending on the situation, both, any one or none could be present. One component can runs offline on the output of the application program, either on the board under evaluation, or on the provisioning server. The other component can run synchronous with, or immediately after, the application run. The same daemon that launches the application may also launch the regressions, possibly on a different thread of execution. Besides testing the validity of the results, the later component could provide an opportunity to clean up, in software, any side effects of the application run before the next application runs or the board is powered off. Any output and error messages from this step can be handled in the same way as the messages from the application run.

Once all the user-requested applications on all the selected boards have finished running, or, optionally, a preset specified timeout, as a total time or time per tests, have elapsed, the evaluation run is considered complete. If any final (i.e. not specific to an individual application run) regression tests or cleanup tasks were specified by the user, they will run at this stage, and their output can be recorded by the same mechanisms as the output of the application run. At this time, the provisioning server may, optionally, shut down the boards that were under evaluation, de-energize their power rails, and notify the user that the tests have completed and results are available.

Several variations on the system and method are possible. For example, as shown in FIG. 2, the user console can be attached to the local network (LAN) 110 or be remotely connected across a wide area network (WAN) 120, and in various embodiments, the provisioning server can also be outside of the LAN and can be connected across a WAN. It is also possible to have multiple of provisioning servers, for reliability or performance reasons, which could be distributed both in the local network and across a WAN. In various embodiments, the user interaction, shown in FIGS. 4-8 can be automated. In such an embodiment, the user pre-selects the constraints that the program running on the user console then uses non-interactively. For example, the constraints could be written out to a file as a key-value pair format as is done programming syntax such as JSON. A parser for the specific format can then replace the manual process depicted in FIGS. 4-8. Further, an inconsistent choice can be indicated by making the choice invisible instead of making it disabled. In various embodiments, the provisioning server 100 and the user console 110 and/or 120 can be the same physical computer with different modules performing the different functions. In such a case, there is no need for the network connection between the two. In various embodiments, the boards under test, instead of being stand-alone boards connected to the provisioning server and user console over a network, could be connected to the provisioning server over a host bus such as PCI, PCI Express, VME etc. In this case, the provisioning server could also act as the user console or the user console could still be attached over a network.

It should be clear that the above-described system and method provides a high range of usefulness and versatility to the user in testing and determining performance characteristics/benchmarks for a wide range of currently available hardware devices and user-selected test software applications. The system and method affords maximum convenience by allowing all operations to be carried out from remote console or workstation (e.g. PC) that can be a few feet from the hardware or an ocean away. More particularly, the system and method affords the user a menu-structure, which can be presented in a convenient web-page format, which provides a series of selections from which the user chooses (e.g. device choices, etc.). The system actually filters selections based upon user inputs in a consistent manner so that each step in the selection process eliminates options that are no longer available (viable/operable) based upon the user's prior selections. This self-consistency assures that the user is left with only choices that meet his or her actual needs and criteria in hardware/software selection. Such hardware under test can include, but is not limited to, a graphics processing unit (GPU), general/central processing unit (CPU), field programmable gate array (FPGA), application-specific integrated circuit (ASIC), complex programmable logic device (CPLD), digital signal processor (DSP), network processing unit (NPU), network fabric switching device, special purpose compute accelerator, data storage device, memory device, and disk The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the system, apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for determination of performance characteristics with respect to electronic hardware and user-selected test software adapted to execute non-transitory computer-readable program instructions on the hardware, the system comprising:

a processor interconnected to a plurality of hardware devices under test, the processor accessing information related to the performance characteristics, wherein the performance characteristics include temperature rise due to device operation, power consumption, execution speed, and electromagnetic (EM) radiation emission; and a system process, operating on the processor, and responsive to local or remote communication from a user, the system process arranged to (a) access a database containing identification and parameter information with respect to each of the hardware devices under test and selected of the device related software, (b) transmit a menu to the user that contains criteria based upon the identification and the parameter information, the menu arranged so that the user can select a subset of the hardware devices under test based upon selection of the criteria input thereby, and the menu being organized to provide a series of selections in corresponding selection steps and is presented to the user such that each selection by the user provides consistent selection options in subsequent selection steps, whereby unavailable options are filtered therefrom, (c) identify one of the hardware devices based upon selection of the local user via the communication, (d) activate the hardware device, (e) operate a software process on the device, and (f) return at least one of the performance characteristics based upon the operation of the software process, wherein the communication provides a web page containing the menu displayed on a remote computer of the user, and wherein the test software is at least one a software defined radio (SDR), a software defined networking (SDN), a software defined power supply (SDP), software defined data storage, software defined electromechanical system and a predetermined software-defined hardware process (SDX).

2. The system as set forth in claim 1, further comprising one or more sensors operatively connected to the hardware devices under test for providing the performance characteristics.

3. The system as set forth in claim 1 wherein the system process is arranged to allow the user to at least one of (a) upload a custom software process to one or more of the selected devices under test and (b) provide a stock software process to the selected devices under test, and wherein the user is interconnected to the processor (a) via a console on a local network or (b) via a computing device on a wide area network.

4. The system as set forth in claim 3 wherein the wide area network defines a cloud-based computing environment and the plurality of hardware devices under test are located in a remote facility on an interconnected network.

5. The system as set forth in claim 3 wherein the system process is arranged to enable the user to select a plurality of hardware devices under test from the subset and determine the performance characteristics thereof with respect to the test software, whereby the plurality of selected hardware devices from the subset are co-tested.

6. The system as set forth in claim 1 wherein the plurality of hardware devices under test include at least one of a graphics processing unit (GPU), general/central processing unit (CPU), field programmable gate array (FPGA), application-specific integrated circuit (ASIC), complex programmable logic device (CPLD), digital signal processor (DSP), network processing unit (NPU), network fabric switching device, special purpose compute accelerator, data storage device, memory device, and disk.

7. The system as set forth in claim 1 wherein at least one of the plurality of devices under test is located in either an ambient environment within the location, or in a controlled environment with changed environmental variables with respect to the ambient environment, and wherein the environmental variables can be at least one of (a) ambient temperature, (b) atmospheric pressure, (c) humidity level, (d) presence of dust or contaminants, (e) electromagnetic radiation, and (f) shock and vibration.

8. The system as set forth in claim 1, further comprising a regression test process, arranged to provide results that determine validity of operation of results of the test software on two or more devices under test of the plurality of hardware devices under test, whereby variability between operation of the test software on two or more devices under test is accounted for.

* * * * *